US00RE43157E

(19) United States
(12) Reissued Patent
Bishop et al.

(10) Patent Number: US RE43,157 E
(45) Date of Reissued Patent: *Feb. 7, 2012

(54) SYSTEM AND METHOD FOR REASSOCIATING AN ACCOUNT NUMBER TO ANOTHER TRANSACTION ACCOUNT

(75) Inventors: Fred Bishop, Glendale, AZ (US); Trey Neemann, Glendale, AZ (US); David Armes, Phoenix, AZ (US)

(73) Assignee: XATRA Fund MX, LLC, Wilmington, DE (US)

( * ) Notice: This patent is subject to a terminal disclaimer.

(21) Appl. No.: 12/023,834

(22) Filed: Jan. 31, 2008

Related U.S. Patent Documents

Reissue of:

(64) Patent No.: 6,991,157
Issued: Jan. 31, 2006
Appl. No.: 10/710,484
Filed: Jul. 14, 2004

U.S. Applications:

(63) Continuation of application No. 10/242,584, filed on Sep. 12, 2002, now Pat. No. 6,805,287.

(51) Int. Cl.
*G06Q 40/00* (2006.01)

(52) U.S. Cl. ..... 235/379; 235/380; 235/382; 235/383

(58) Field of Classification Search ..... 235/379, 235/380, 382, 382.5, 383; 705/35, 41, 44, 705/68, 70, 75

See application file for complete search history.

(56) References Cited

U.S. PATENT DOCUMENTS

| | | | |
|---|---|---|---|
| D61,466 | S | 9/1922 | Foltz |
| 2,767,756 | A | 10/1956 | Niles |
| 3,376,661 | A | 4/1968 | Hulett |
| 3,446,260 | A | 5/1969 | Osher |
| 3,536,894 | A | 10/1970 | Travioli |
| 3,573,731 | A | 4/1971 | Schwend |
| 3,725,647 | A | 4/1973 | Retzky |
| 3,763,356 | A | 10/1973 | Berler |
| 3,829,662 | A | 8/1974 | Furahashi |
| 3,838,252 | A | 9/1974 | Hynes et al. |
| 3,873,813 | A | 3/1975 | Lahr et al. |
| 3,894,756 | A | 7/1975 | Ward |
| 3,914,762 | A | 10/1975 | Klensch |
| 3,929,177 | A | 12/1975 | Reis |
| 3,955,295 | A | 5/1976 | Mayer |

(Continued)

FOREIGN PATENT DOCUMENTS

| | | |
|---|---|---|
| CA | 2300241 | 9/2000 |

(Continued)

OTHER PUBLICATIONS

"What's New: Timex Watch Features Speedpass System", http://www.speedpass.com/news/article.jsp?id=51 (1 page).

(Continued)

*Primary Examiner* — Ahshik Kim
(74) *Attorney, Agent, or Firm* — Snell & Wilmer L.L.P.

(57) ABSTRACT

A method and system for converting a first transaction account device to a second transaction account device wherein a card number associated with, or defined as, a first transaction account (e.g., stored value account) is re-associated with, or re-defined as, a second transaction account (e.g., credit card account).

15 Claims, 4 Drawing Sheets

U.S. PATENT DOCUMENTS

| | | | |
|---|---|---|---|
| 4,044,231 | A | 8/1977 | Beck et al. |
| 4,048,737 | A | 9/1977 | McDermott |
| 4,056,139 | A | 11/1977 | Murt |
| 4,058,839 | A | 11/1977 | Darjany |
| 4,066,873 | A | 1/1978 | Schatz |
| 4,119,361 | A | 10/1978 | Greenaway |
| 4,202,491 | A | 5/1980 | Suzuki |
| 4,206,965 | A | 6/1980 | McGrew |
| 4,222,516 | A | 9/1980 | Badet et al. |
| 4,277,863 | A | 7/1981 | Faneuf |
| 4,303,904 | A | 12/1981 | Chasek |
| 4,318,554 | A | 3/1982 | Anderson et al. |
| 4,356,646 | A | 11/1982 | Johnson, Jr. |
| 4,361,757 | A | 11/1982 | Ehrat |
| D270,303 | S | 8/1983 | Zautner |
| D270,546 | S | 9/1983 | Malmberg |
| 4,421,380 | A | 12/1983 | McGrew |
| 4,436,991 | A | 3/1984 | Albert et al. |
| 4,443,027 | A | 4/1984 | McNeely et al. |
| 4,450,535 | A | 5/1984 | dePommery et al. |
| 4,453,074 | A | 6/1984 | Weinstein |
| 4,475,308 | A | 10/1984 | Heise et al. |
| 4,504,084 | A | 3/1985 | Jauch |
| 4,507,652 | A | 3/1985 | Vogt et al. |
| D280,214 | S | 8/1985 | Opel |
| 4,538,059 | A | 8/1985 | Rudland |
| 4,547,002 | A | 10/1985 | Colgate, Jr. |
| 4,558,211 | A | 12/1985 | Berstein |
| 4,563,024 | A | 1/1986 | Blyth |
| 4,581,523 | A | 4/1986 | Okuno |
| 4,582,985 | A | 4/1986 | Lofberg |
| 4,583,766 | A | 4/1986 | Wessel |
| 4,589,686 | A | 5/1986 | McGrew |
| 4,593,936 | A | 6/1986 | Opel |
| 4,597,814 | A | 7/1986 | Colgate, Jr. |
| 4,639,765 | A | 1/1987 | d'Hont |
| 4,641,017 | A | 2/1987 | Lopata |
| 4,643,452 | A | 2/1987 | Chang |
| 4,656,463 | A | 4/1987 | Anders et al. |
| 4,663,518 | A | 5/1987 | Borror et al. |
| 4,672,021 | A | 6/1987 | Blumel et al. |
| 4,684,795 | A | 8/1987 | Colgate, Jr. |
| 4,692,394 | A | 9/1987 | Drexler |
| 4,694,148 | A | 9/1987 | Diekemper et al. |
| 4,697,073 | A | 9/1987 | Hara |
| 4,697,363 | A | 10/1987 | Gamm |
| 4,700,055 | A | 10/1987 | Kashkashian, Jr. |
| 4,711,690 | A | 12/1987 | Haghiri-Tehrani |
| 4,717,221 | A | 1/1988 | McGrew |
| 4,725,719 | A | 2/1988 | Oncken et al. |
| 4,736,094 | A | 4/1988 | Yoshida |
| 4,739,328 | A | 4/1988 | Koelle et al. |
| 4,744,497 | A | 5/1988 | O'Neal |
| 4,747,147 | A | 5/1988 | Sparrow |
| 4,768,811 | A | 9/1988 | Oshikoshi et al. |
| 4,779,898 | A | 10/1988 | Berning et al. |
| 4,794,142 | A | 12/1988 | Alberts et al. |
| 4,795,894 | A | 1/1989 | Sugimoto et al. |
| 4,801,790 | A | 1/1989 | Solo |
| 4,816,653 | A | 3/1989 | Anderl et al. |
| 4,829,690 | A | 5/1989 | Andros |
| 4,837,422 | A | 6/1989 | Dethloff et al. |
| 4,839,504 | A | 6/1989 | Nakano |
| 4,841,570 | A | 6/1989 | Cooper |
| 4,849,617 | A | 7/1989 | Ueda |
| 4,852,911 | A | 8/1989 | Hoppe |
| 4,853,525 | A | 8/1989 | Vogt et al. |
| 4,863,819 | A | 9/1989 | Drexler et al. |
| 4,868,849 | A | 9/1989 | Tamaoki |
| 4,884,507 | A | 12/1989 | Levy |
| 4,889,366 | A | 12/1989 | Fabbiani |
| 4,897,533 | A | 1/1990 | Lyszczarz |
| 4,897,947 | A | 2/1990 | Kass-Pious |
| 4,910,521 | A | 3/1990 | Mellon |
| 4,917,292 | A | 4/1990 | Drexler |
| 4,918,432 | A | 4/1990 | Pauley et al. |
| D307,979 | S | 5/1990 | Purvis |
| 4,937,963 | A | 7/1990 | Barnes |
| D310,386 | S | 9/1990 | Michels et al. |
| 4,961,142 | A | 10/1990 | Elliott et al. |
| 4,984,270 | A | 1/1991 | LaBounty |
| 4,993,068 | A | 2/1991 | Piosenka et al. |
| 4,998,753 | A | 3/1991 | Wichael |
| 5,004,899 | A | 4/1991 | Ueda |
| 5,010,243 | A | 4/1991 | Fukushima et al. |
| 5,015,830 | A | 5/1991 | Masuzawa et al. |
| 5,016,274 | A | 5/1991 | Micali et al. |
| 5,023,782 | A | 6/1991 | Lutz et al. |
| 5,023,908 | A | 6/1991 | Weiss |
| 5,025,372 | A | 6/1991 | Burton et al. |
| 5,052,328 | A | 10/1991 | Eppenbach |
| 5,053,774 | A | 10/1991 | Schuermann et al. |
| 5,068,894 | A | 11/1991 | Hoppe |
| 5,096,228 | A | 3/1992 | Rinderknecht |
| 5,099,226 | A | 3/1992 | Andrews |
| 5,101,200 | A | 3/1992 | Swett |
| 5,106,125 | A | 4/1992 | Antes |
| 5,111,033 | A | 5/1992 | Fujita et al. |
| 5,125,356 | A | 6/1992 | Galante |
| 5,142,383 | A | 8/1992 | Mallik |
| 5,171,039 | A | 12/1992 | Dusek |
| 5,175,416 | A | 12/1992 | Mansvelt et al. |
| 5,180,902 | A | 1/1993 | Schick et al. |
| 5,192,947 | A | 3/1993 | Neustein |
| 5,193,114 | A | 3/1993 | Moseley |
| 5,197,140 | A | 3/1993 | Balmer |
| 5,198,647 | A | 3/1993 | Mizuta |
| 5,202,826 | A | 4/1993 | McCarthy |
| 5,206,488 | A | 4/1993 | Teicher |
| 5,208,110 | A | 5/1993 | Smith et al. |
| 5,212,777 | A | 5/1993 | Gove et al. |
| 5,217,844 | A | 6/1993 | Fukushima et al. |
| 5,221,838 | A | 6/1993 | Gutman et al. |
| 5,222,282 | A | 6/1993 | Sukonnik et al. |
| 5,226,989 | A | 7/1993 | Sukonnik |
| 5,234,624 | A | 8/1993 | Bauer et al. |
| 5,239,654 | A | 8/1993 | Ing-Simmons et al. |
| 5,245,329 | A | 9/1993 | Gokcebay |
| 5,247,304 | A | 9/1993 | d'Hont |
| 5,251,937 | A | 10/1993 | Ojster |
| 5,256,473 | A | 10/1993 | Kotani et al. |
| 5,257,656 | A | 11/1993 | McLeroy |
| 5,259,649 | A | 11/1993 | Shomron |
| 5,272,326 | A | 12/1993 | Fujita et al. |
| 5,274,392 | A | 12/1993 | d'Hont et al. |
| 5,276,311 | A | 1/1994 | Hennige |
| 5,279,019 | A | 1/1994 | Knickle |
| 5,285,100 | A | 2/1994 | Byatt |
| 5,288,978 | A | 2/1994 | Iijima |
| 5,300,764 | A | 4/1994 | Hoshino et al. |
| 5,304,789 | A | 4/1994 | Lob et al. |
| 5,305,002 | A | 4/1994 | Holodak et al. |
| 5,308,121 | A | 5/1994 | Gunn |
| 5,311,679 | A | 5/1994 | Birch, Sr. |
| 5,321,751 | A | 6/1994 | Ray et al. |
| 5,326,960 | A | 7/1994 | Tannenbaum |
| 5,326,964 | A | 7/1994 | Risser |
| 5,329,617 | A | 7/1994 | Asal |
| 5,331,138 | A | 7/1994 | Saroya |
| 5,339,447 | A | 8/1994 | Balmer |
| 5,349,357 | A | 9/1994 | Schurmann |
| 5,351,052 | A | 9/1994 | d'Hont et al. |
| 5,351,142 | A | 9/1994 | Cueli |
| 5,355,411 | A | 10/1994 | MacDonald |
| 5,359,522 | A | 10/1994 | Ryan |
| 5,365,551 | A | 11/1994 | Snodgrass et al. |
| 5,371,896 | A | 12/1994 | Gove et al. |
| 5,373,303 | A | 12/1994 | d'Hont |
| 5,383,687 | A | 1/1995 | Suess et al. |
| 5,397,881 | A | 3/1995 | Mannik |
| 5,407,893 | A | 4/1995 | Koshizuka et al. |
| 5,408,243 | A | 4/1995 | d'Hont |
| 5,410,142 | A | 4/1995 | Tsuboi et al. |
| 5,410,649 | A | 4/1995 | Gove |
| 5,412,192 | A | 5/1995 | Hoss |
| 5,428,363 | A | 6/1995 | d'Hont |
| 5,438,184 | A | 8/1995 | Roberts et al. |

5,453,747 A 9/1995 d'Hont et al.
5,461,217 A 10/1995 Claus
5,461,219 A 10/1995 Cronvall
5,471,592 A 11/1995 Gove et al.
5,477,038 A 12/1995 Levine et al.
5,477,040 A 12/1995 Lalonde
5,478,629 A 12/1995 Norman
5,479,494 A 12/1995 Clitherow
5,479,530 A 12/1995 Nair et al.
5,485,510 A 1/1996 Colbert
5,488,376 A 1/1996 Hurta et al.
5,489,411 A 2/1996 Jha et al.
5,489,908 A 2/1996 Orthmann et al.
5,490,079 A 2/1996 Sharpe et al.
5,491,483 A 2/1996 d'Hont
5,491,484 A 2/1996 Schuermann
5,491,715 A 2/1996 Flaxl
5,493,312 A 2/1996 Knebelkamp
5,497,121 A 3/1996 d'Hont
5,500,513 A 3/1996 Langhans et al.
5,500,651 A 3/1996 Schuermann
5,503,434 A 4/1996 Gunn
5,504,808 A 4/1996 Schuermann
5,506,395 A 4/1996 Eppley
5,513,272 A 4/1996 Bogosian, Jr.
5,513,525 A 5/1996 Schurmann
5,514,860 A 5/1996 Berson
5,516,153 A 5/1996 Kaule
5,518,810 A 5/1996 Nishihara et al.
5,519,381 A 5/1996 Marsh et al.
5,520,230 A 5/1996 Sumner, III
5,521,966 A 5/1996 Friedes et al.
5,522,083 A 5/1996 Gove et al.
5,525,992 A 6/1996 Froschermeier
5,525,994 A 6/1996 Hurta et al.
5,528,222 A 6/1996 Moskowitz et al.
5,530,232 A 6/1996 Taylor
5,533,656 A 7/1996 Bonaldi
5,534,857 A 7/1996 Laing et al.
5,537,314 A 7/1996 Kanter
5,539,825 A 7/1996 Akiyama
5,541,582 A 7/1996 Wagner et al.
5,541,604 A 7/1996 Meier
5,543,798 A 8/1996 Schuermann
5,544,246 A 8/1996 Mandelbaum et al.
5,548,291 A 8/1996 Meier et al.
5,550,536 A 8/1996 Flaxl
5,550,548 A 8/1996 Schuermann
5,552,789 A 9/1996 Schuermann
5,555,877 A 9/1996 Lockwood et al.
5,557,279 A 9/1996 d'Hont
5,557,516 A 9/1996 Hogan
5,559,504 A 9/1996 Itsumi et al.
5,559,887 A 9/1996 Davis et al.
5,561,430 A 10/1996 Knebelkamp
5,563,582 A 10/1996 d'Hont
5,569,187 A 10/1996 Kaiser
5,569,897 A 10/1996 Masuda
5,572,226 A 11/1996 Tuttle
5,572,815 A 11/1996 Kovner
5,575,094 A 11/1996 Leake et al.
5,577,109 A 11/1996 Stimson et al.
5,577,120 A 11/1996 Penzias
5,577,121 A 11/1996 Davis et al.
5,577,609 A 11/1996 Hexter
5,578,808 A 11/1996 Taylor
5,581,630 A 12/1996 Bonneau, Jr.
5,585,787 A 12/1996 Wallerstein
5,590,038 A 12/1996 Pitroda
5,590,197 A 12/1996 Chen et al.
5,592,150 A 1/1997 d'Hont
5,592,405 A 1/1997 Gove et al.
5,592,767 A 1/1997 Treske
5,594,227 A 1/1997 Deo
5,594,233 A 1/1997 Kenneth et al.
5,594,448 A 1/1997 d'Hont
5,597,534 A 1/1997 Kaiser
5,600,175 A 2/1997 Orthmann
5,602,538 A 2/1997 Orthmann et al.
5,602,918 A 2/1997 Chen et al.
5,602,919 A 2/1997 Hurta et al.
5,604,342 A 2/1997 Fujioka
5,604,801 A 2/1997 Dolan et al.
5,606,520 A 2/1997 Gove et al.
5,606,594 A 2/1997 Register et al.
5,607,522 A 3/1997 McDonnell
5,608,203 A 3/1997 Finkelstein et al.
5,608,406 A 3/1997 Eberth et al.
5,608,778 A 3/1997 Partridge, III
5,611,965 A 3/1997 Shouji et al.
5,613,001 A 3/1997 Bakhoum
5,613,131 A 3/1997 Moss et al.
5,613,146 A 3/1997 Gove et al.
5,614,703 A 3/1997 Martin et al.
5,619,207 A 4/1997 d'Hont
5,621,199 A 4/1997 Calari et al.
5,621,396 A 4/1997 Flaxl
5,621,411 A 4/1997 Hagl et al.
5,621,412 A 4/1997 Sharpe et al.
5,625,366 A 4/1997 d'Hont
5,625,370 A 4/1997 d'Hont
5,625,695 A 4/1997 M'Raihi et al.
5,629,981 A 5/1997 Nerlikar
5,638,080 A 6/1997 Orthmann et al.
5,640,002 A 6/1997 Ruppert et al.
5,641,050 A 6/1997 Smith et al.
5,646,607 A 7/1997 Schurmann et al.
5,649,118 A 7/1997 Carlisle et al.
5,657,388 A 8/1997 Weiss
5,660,319 A 8/1997 Falcone et al.
5,665,439 A 9/1997 Andersen et al.
5,668,876 A 9/1997 Falk et al.
5,673,106 A 9/1997 Thompson
D384,971 S 10/1997 Kawan
5,675,342 A 10/1997 Sharpe
5,677,953 A 10/1997 Dolphin
5,686,920 A 11/1997 Hurta et al.
5,689,100 A 11/1997 Carrithers
5,691,731 A 11/1997 vanErven
5,692,132 A 11/1997 Hogan
5,694,596 A 12/1997 Campbell
5,696,913 A 12/1997 Gove et al.
5,697,649 A 12/1997 Dames et al.
5,698,837 A 12/1997 Furuta
5,699,528 A 12/1997 Hogan
5,700,037 A 12/1997 Keller
5,701,127 A 12/1997 Sharpe
5,704,046 A 12/1997 Hogan
5,705,101 A 1/1998 Oi et al.
5,705,798 A 1/1998 Tarbox
5,705,852 A 1/1998 Orihara et al.
5,710,421 A 1/1998 Kokubu
5,715,399 A 2/1998 Bezos
5,720,500 A 2/1998 Okazaki et al.
5,721,781 A 2/1998 Deo et al.
5,724,424 A 3/1998 Gifford
5,725,098 A 3/1998 Seifert et al.
5,727,140 A 3/1998 Ohtomo et al.
5,727,696 A 3/1998 Valiulis
5,729,053 A 3/1998 Orthmann
5,729,236 A 3/1998 Flaxl
5,731,957 A 3/1998 Brennan
5,732,579 A 3/1998 d'Hont et al.
5,734,838 A 3/1998 Robinson et al.
5,737,439 A 4/1998 Lapsley et al.
5,739,512 A 4/1998 Toganazzini
5,742,756 A 4/1998 Dillaway et al.
5,742,845 A 4/1998 Wagner
5,745,571 A 4/1998 Zuk
5,748,137 A 5/1998 d'Hont
5,748,737 A 5/1998 Daggar
5,757,917 A 5/1998 Rose et al.
5,758,195 A 5/1998 Balmer
5,761,306 A 6/1998 Lewis
5,761,493 A 6/1998 Blakeley et al.
5,764,789 A 6/1998 Pare, Jr. et al.
5,768,385 A 6/1998 Simon
5,768,609 A 6/1998 Gove et al.

5,769,457 A 6/1998 Warther
5,770,843 A 6/1998 Rose et al.
5,773,812 A 6/1998 Kreft
5,774,882 A 6/1998 Keen et al.
5,777,903 A 7/1998 Piosenka
5,778,067 A 7/1998 Jones et al.
5,778,069 A 7/1998 Thomlinson
5,778,173 A 7/1998 Apte
5,785,680 A 7/1998 Niezink et al.
5,786,587 A 7/1998 Colgate, Jr.
5,789,733 A 8/1998 Jachimowicz et al.
5,791,474 A 8/1998 Hansen
5,792,337 A 8/1998 Padovani et al.
5,793,324 A 8/1998 Aslanidis et al.
5,794,095 A 8/1998 Thompson
5,796,831 A 8/1998 Paradinas et al.
5,797,060 A 8/1998 Thompson
5,797,085 A 8/1998 Buek et al.
5,797,133 A 8/1998 Jones et al.
5,798,709 A 8/1998 Flaxl
5,799,087 A 8/1998 Rosen
5,806,045 A 9/1998 Biorge et al.
5,808,758 A 9/1998 Solmsdorf
5,809,142 A 9/1998 Hurta et al.
5,809,288 A 9/1998 Balmer
5,809,633 A 9/1998 Mundigl et al.
5,815,252 A 9/1998 Price-Francis
5,815,657 A 9/1998 Williams et al.
5,823,359 A 10/1998 Harris et al.
5,825,007 A 10/1998 Jesadanont
5,825,302 A 10/1998 Stafford
5,826,077 A 10/1998 Blakeley et al.
5,826,241 A 10/1998 Stein et al.
5,826,242 A 10/1998 Montulli
5,826,243 A 10/1998 Musmanno et al.
5,828,044 A 10/1998 Jun et al.
5,834,756 A 11/1998 Gutman et al.
5,835,894 A 11/1998 Adcock et al.
5,838,257 A 11/1998 Lambropoulos
5,838,720 A 11/1998 Morelli
5,838,818 A 11/1998 Herley
5,841,364 A 11/1998 Hagl et al.
5,842,088 A 11/1998 Thompson
5,844,218 A 12/1998 Kawan et al.
5,844,230 A 12/1998 Lalonde
5,845,267 A 12/1998 Ronen
5,851,149 A 12/1998 Xidos et al.
5,852,812 A 12/1998 Reeder
5,854,891 A 12/1998 Postlewaite et al.
5,856,048 A 1/1999 Tahara et al.
5,857,079 A 1/1999 Claus et al.
5,857,152 A 1/1999 Everett
5,857,709 A 1/1999 Chock
5,858,006 A 1/1999 Van der AA et al.
5,859,419 A 1/1999 Wynn
5,859,587 A 1/1999 Alicot et al.
5,859,779 A 1/1999 Giordano et al.
5,862,325 A 1/1999 Reed et al.
5,864,306 A 1/1999 Dwyer et al.
5,864,323 A 1/1999 Berthon
5,864,830 A 1/1999 Armetta et al.
5,865,470 A 2/1999 Thompson
5,867,100 A 2/1999 d'Hont
5,869,822 A 2/1999 Meadows et al.
5,870,031 A 2/1999 Kaiser et al.
5,870,723 A 2/1999 Pare, Jr. et al.
5,870,915 A 2/1999 d'Hont
5,875,432 A 2/1999 Sehr
D406,861 S 3/1999 Leedy, Jr.
5,878,138 A 3/1999 Yacobi
5,878,141 A 3/1999 Daly et al.
5,878,215 A 3/1999 Kling et al.
5,878,337 A 3/1999 Joao et al.
5,878,403 A 3/1999 DeFrancesco et al.
5,880,675 A 3/1999 Trautner
5,881,272 A 3/1999 Balmer
5,883,377 A 3/1999 Chapin, Jr.
5,883,810 A 3/1999 Franklin et al.
5,884,271 A 3/1999 Pitroda
5,884,280 A 3/1999 Yoshioka et al.
5,884,292 A 3/1999 Baker et al.
5,884,310 A 3/1999 Brichta et al.
5,886,333 A 3/1999 Miyake
5,887,266 A 3/1999 Heinonen et al.
5,889,941 A 3/1999 Tushie et al.
5,890,137 A 3/1999 Koreeda
D408,054 S 4/1999 Leedy, Jr.
5,892,211 A 4/1999 Davis et al.
5,897,622 A 4/1999 Blinn et al.
5,898,783 A 4/1999 Rohrbach
5,898,838 A 4/1999 Wagner
5,900,954 A 5/1999 Katz et al.
5,901,239 A 5/1999 Kamei
5,903,830 A 5/1999 Joao et al.
5,903,875 A 5/1999 Kohara
5,903,880 A 5/1999 Biffar
5,905,798 A 5/1999 Nerlikar et al.
5,905,908 A 5/1999 Wagner
5,907,620 A 5/1999 Klemba et al.
5,909,492 A 6/1999 Payne et al.
5,912,446 A 6/1999 Wong et al.
5,912,678 A 6/1999 Saxena et al.
5,913,203 A 6/1999 Wong et al.
5,914,472 A 6/1999 Foladare et al.
5,915,016 A 6/1999 Savalle et al.
5,915,023 A 6/1999 Bernstein
5,915,973 A 6/1999 Hoehn-Saric et al.
5,917,168 A 6/1999 Nakamura et al.
5,917,913 A 6/1999 Wang
5,917,925 A 6/1999 Moore
5,918,216 A 6/1999 Miksovsky et al.
5,920,058 A 7/1999 Weber et al.
5,920,628 A 7/1999 Indeck et al.
5,920,629 A 7/1999 Rosen
5,920,847 A 7/1999 Kolling et al.
5,923,734 A 7/1999 Taskett
5,923,884 A 7/1999 Peyret et al.
5,924,080 A 7/1999 Johnson
5,924,624 A 7/1999 Martin
5,928,788 A 7/1999 Riedl
5,929,801 A 7/1999 Aslanidis et al.
5,930,767 A 7/1999 Reber et al.
5,930,777 A 7/1999 Barber
5,931,917 A 8/1999 Nguyen et al.
5,932,870 A 8/1999 Berson
5,933,328 A 8/1999 Wallace et al.
5,933,624 A 8/1999 Balmer
5,936,221 A 8/1999 Corder et al.
5,936,226 A 8/1999 Aucsmith
5,936,227 A 8/1999 Truggelmann et al.
5,938,010 A 8/1999 Osterbye
5,942,761 A 8/1999 Tuli
5,943,624 A 8/1999 Fox et al.
5,945,653 A 8/1999 Walker et al.
5,948,116 A 9/1999 Aslanidis et al.
5,949,044 A 9/1999 Walker et al.
5,949,335 A 9/1999 Maynard
5,949,876 A 9/1999 Ginter et al.
5,950,174 A 9/1999 Brendzel
5,950,179 A 9/1999 Buchanan
5,953,512 A 9/1999 Cai et al.
5,953,710 A 9/1999 Fleming
5,955,717 A 9/1999 Vanstone
5,955,951 A 9/1999 Wischerop et al.
5,955,969 A 9/1999 d'Hont
5,956,024 A 9/1999 Strickland et al.
5,956,693 A 9/1999 Geerlings
5,956,699 A 9/1999 Wong et al.
5,958,004 A 9/1999 Helland et al.
5,960,411 A 9/1999 Hartman et al.
5,960,416 A 9/1999 Block
5,963,915 A 10/1999 Kirsch
5,963,924 A 10/1999 Williams et al.
5,966,697 A 10/1999 Fergerson et al.
5,968,570 A 10/1999 Paulucci
5,969,318 A 10/1999 Mackenthun
5,970,148 A 10/1999 Meier
5,970,470 A 10/1999 Walker

| | | | |
|---|---|---|---|
| 5,970,471 | A | 10/1999 | Hill |
| 5,970,472 | A | 10/1999 | Allsop et al. |
| 5,970,473 | A | 10/1999 | Gerszberg et al. |
| 5,970,475 | A | 10/1999 | Barnes et al. |
| 5,970,478 | A | 10/1999 | Walker et al. |
| 5,971,276 | A | 10/1999 | Sano et al. |
| 5,973,475 | A | 10/1999 | Cornbaluzier |
| 5,974,238 | A | 10/1999 | Chase, Jr. |
| RE36,365 | E | 11/1999 | Levine et al. |
| 5,978,348 | A | 11/1999 | Tamura |
| 5,978,840 | A | 11/1999 | Nguyen et al. |
| 5,979,757 | A | 11/1999 | Tracy et al. |
| 5,979,942 | A | 11/1999 | Ivicic |
| 5,982,293 | A | 11/1999 | Everett et al. |
| 5,983,200 | A | 11/1999 | Slotznick |
| 5,983,207 | A | 11/1999 | Turk et al. |
| 5,983,208 | A | 11/1999 | Haller |
| 5,984,180 | A | 11/1999 | Albrecht |
| 5,987,140 | A | 11/1999 | Rowney et al. |
| 5,987,155 | A | 11/1999 | Dunn et al. |
| 5,987,498 | A | 11/1999 | Athing et al. |
| 5,988,497 | A | 11/1999 | Wallace |
| 5,988,510 | A | 11/1999 | Tuttle |
| 5,989,950 | A | 11/1999 | Wu |
| 5,991,413 | A | 11/1999 | Arditti et al. |
| 5,991,608 | A | 11/1999 | Leyten |
| 5,991,748 | A | 11/1999 | Taskett |
| 5,991,750 | A | 11/1999 | Watson |
| 5,995,014 | A | 11/1999 | DiMaria |
| 5,996,076 | A | 11/1999 | Rowney et al. |
| 5,999,914 | A | 12/1999 | Blinn et al. |
| 6,000,832 | A | 12/1999 | Franklin et al. |
| 6,002,438 | A | 12/1999 | Hocevar et al. |
| 6,002,767 | A | 12/1999 | Kramer |
| 6,003,014 | A | 12/1999 | Lee et al. |
| 6,005,942 | A | 12/1999 | Chan et al. |
| 6,006,216 | A | 12/1999 | Griffin et al. |
| 6,006,988 | A | 12/1999 | Behrmann et al. |
| 6,009,412 | A | 12/1999 | Storey |
| 6,011,487 | A | 1/2000 | Plocher |
| 6,012,039 | A | 1/2000 | Hoffman et al. |
| 6,012,049 | A | 1/2000 | Kawan |
| 6,012,143 | A | 1/2000 | Tanaka |
| 6,012,636 | A | 1/2000 | Smith |
| 6,014,634 | A | 1/2000 | Scroggie et al. |
| 6,014,635 | A | 1/2000 | Harris et al. |
| 6,014,636 | A | 1/2000 | Reeder |
| 6,014,645 | A | 1/2000 | Cunningham |
| 6,014,646 | A | 1/2000 | Vallee et al. |
| 6,014,648 | A | 1/2000 | Brennan |
| 6,014,650 | A | 1/2000 | Zampese |
| 6,014,748 | A | 1/2000 | Tushi et al. |
| 6,016,476 | A | 1/2000 | Maes et al. |
| 6,016,482 | A | 1/2000 | Molinari et al. |
| 6,016,484 | A | 1/2000 | Williams et al. |
| 6,018,717 | A | 1/2000 | Lee et al. |
| 6,018,718 | A | 1/2000 | Walker et al. |
| RE36,580 | E | 2/2000 | Bogosian, Jr. |
| 6,021,943 | A | 2/2000 | Chastain |
| 6,023,510 | A | 2/2000 | Epstein |
| 6,024,286 | A | 2/2000 | Bradley et al. |
| 6,024,385 | A | 2/2000 | Goda |
| 6,025,283 | A | 2/2000 | Roberts |
| 6,027,028 | A | 2/2000 | Pieterse et al. |
| 6,029,147 | A | 2/2000 | Horadan et al. |
| 6,029,149 | A | 2/2000 | Dykstra et al. |
| 6,029,150 | A | 2/2000 | Kravitz |
| 6,029,175 | A | 2/2000 | Chow |
| 6,029,890 | A | 2/2000 | Austin |
| 6,029,892 | A | 2/2000 | Miyake |
| 6,032,136 | A | 2/2000 | Brake, Jr. et al. |
| 6,032,866 | A | 3/2000 | Knighton et al. |
| 6,036,100 | A | 3/2000 | Asami |
| 6,038,292 | A | 3/2000 | Thomas |
| 6,038,551 | A | 3/2000 | Barlow et al. |
| 6,038,584 | A | 3/2000 | Balmer |
| 6,041,308 | A | 3/2000 | Walker et al. |
| 6,041,410 | A | 3/2000 | Hsu et al. |
| 6,041,412 | A | 3/2000 | Timson et al. |
| 6,044,360 | A | 3/2000 | Picciallo |
| 6,044,388 | A | 3/2000 | DeBellis et al. |
| 6,045,050 | A | 4/2000 | Ippolito et al. |
| 6,047,888 | A | 4/2000 | Dethloff |
| 6,050,494 | A | 4/2000 | Song et al. |
| 6,050,605 | A | 4/2000 | Miklionis et al. |
| 6,052,675 | A | 4/2000 | Checchio |
| 6,058,418 | A | 5/2000 | Kobata |
| 6,058,476 | A | 5/2000 | Matsuzaki et al. |
| 6,060,815 | A | 5/2000 | Nysen |
| 6,061,344 | A | 5/2000 | Wood, Jr. |
| 6,061,789 | A | 5/2000 | Hauser et al. |
| 6,064,320 | A | 5/2000 | d'Hont et al. |
| 6,064,751 | A | 5/2000 | Smithies et al. |
| 6,064,981 | A | 5/2000 | Barni et al. |
| 6,065,675 | A | 5/2000 | Teicher |
| 6,068,184 | A | 5/2000 | Barnett |
| 6,068,193 | A | 5/2000 | Kreft |
| 6,070,003 | A | 5/2000 | Gove et al. |
| 6,070,150 | A | 5/2000 | Remington et al. |
| 6,070,154 | A | 5/2000 | Tavor et al. |
| 6,072,870 | A | 6/2000 | Nguyen et al. |
| 6,073,112 | A | 6/2000 | Geerlings |
| 6,073,236 | A | 6/2000 | Kusakabe et al. |
| 6,073,840 | A | 6/2000 | Marion |
| 6,076,076 | A | 6/2000 | Gottfreid |
| 6,076,078 | A | 6/2000 | Camp et al. |
| 6,076,296 | A | 6/2000 | Schaeffer |
| 6,078,888 | A | 6/2000 | Johnson, Jr. |
| 6,078,906 | A | 6/2000 | Huberman |
| 6,078,908 | A | 6/2000 | Schmitz |
| 6,081,790 | A | 6/2000 | Rosen |
| RE36,788 | E | 7/2000 | Mansvelt et al. |
| 6,082,422 | A | 7/2000 | Kaminski |
| 6,084,967 | A | 7/2000 | Kennedy et al. |
| 6,085,976 | A | 7/2000 | Sehr |
| 6,086,971 | A | 7/2000 | Haas et al. |
| 6,088,683 | A | 7/2000 | Jalili |
| 6,088,686 | A | 7/2000 | Walker et al. |
| 6,088,717 | A | 7/2000 | Reed et al. |
| 6,088,755 | A | 7/2000 | Kobayashi et al. |
| 6,088,797 | A | 7/2000 | Rosen |
| 6,089,611 | A | 7/2000 | Blank |
| 6,091,835 | A | 7/2000 | Smithies et al. |
| 6,092,057 | A | 7/2000 | Zimmerman et al. |
| 6,092,198 | A | 7/2000 | Lanzy et al. |
| 6,095,411 | A | 8/2000 | Schrenk |
| 6,095,413 | A | 8/2000 | Tetro et al. |
| 6,095,567 | A | 8/2000 | Buell |
| 6,098,053 | A | 8/2000 | Slater |
| 6,098,879 | A | 8/2000 | Terranova |
| 6,099,043 | A | 8/2000 | Story |
| 6,100,804 | A | 8/2000 | Brady et al. |
| 6,101,174 | A | 8/2000 | Langston |
| 6,101,477 | A | 8/2000 | Hohle et al. |
| 6,102,162 | A | 8/2000 | Teicher |
| 6,102,672 | A | 8/2000 | Woollenweber |
| 6,104,281 | A | 8/2000 | Heinrich et al. |
| 6,104,311 | A | 8/2000 | Lastinger |
| 6,104,922 | A | 8/2000 | Baumann |
| 6,105,008 | A | 8/2000 | Davis et al. |
| 6,105,013 | A | 8/2000 | Curry et al. |
| 6,105,865 | A | 8/2000 | Hardesty |
| 6,107,920 | A | 8/2000 | Eberhardt et al. |
| 6,108,641 | A | 8/2000 | Kenna et al. |
| 6,109,525 | A | 8/2000 | Blomqvist et al. |
| 6,112,152 | A | 8/2000 | Tuttle |
| 6,112,191 | A | 8/2000 | Burke |
| 6,112,984 | A | 9/2000 | Snavely |
| 6,115,040 | A | 9/2000 | Bladow et al. |
| 6,115,360 | A | 9/2000 | Quay et al. |
| 6,115,458 | A | 9/2000 | Taskett |
| 6,116,423 | A | 9/2000 | Troxtell, Jr. et al. |
| 6,116,505 | A | 9/2000 | Withrow |
| 6,116,655 | A | 9/2000 | Thouin et al. |
| 6,116,736 | A | 9/2000 | Stark et al. |
| 6,118,189 | A | 9/2000 | Flaxl |
| 6,120,461 | A | 9/2000 | Smyth |
| 6,121,544 | A | 9/2000 | Petsinger |

| | | | |
|---|---|---|---|
| 6,122,625 | A | 9/2000 | Rosen |
| 6,123,223 | A | 9/2000 | Watkins |
| 6,125,352 | A | 9/2000 | Franklin et al. |
| D432,939 | S | 10/2000 | Hooglander |
| 6,128,604 | A | 10/2000 | Sakamaki et al. |
| 6,129,274 | A | 10/2000 | Suzuki |
| 6,130,623 | A | 10/2000 | MacLellan et al. |
| 6,133,834 | A | 10/2000 | Eberth et al. |
| 6,138,913 | A | 10/2000 | Cyr et al. |
| 6,138,917 | A | 10/2000 | Chapin, Jr. |
| 6,141,651 | A | 10/2000 | Riley et al. |
| 6,141,752 | A | 10/2000 | Dancs et al. |
| 6,144,916 | A | 11/2000 | Wood et al. |
| 6,144,948 | A | 11/2000 | Walker et al. |
| 6,148,093 | A | 11/2000 | McConnell et al. |
| 6,148,484 | A | 11/2000 | Andreae, Jr. |
| 6,154,879 | A | 11/2000 | Pare et al. |
| 6,155,168 | A | 12/2000 | Sakamoto |
| 6,157,824 | A | 12/2000 | Bailey |
| 6,163,771 | A | 12/2000 | Walker et al. |
| 6,167,236 | A | 12/2000 | Kaiser et al. |
| 6,168,083 | B1 | 1/2001 | Berger et al. |
| 6,171,138 | B1 | 1/2001 | Lefebvre et al. |
| 6,173,269 | B1 | 1/2001 | Solokl et al. |
| 6,173,272 | B1 | 1/2001 | Thomas et al. |
| 6,173,897 | B1 | 1/2001 | Halpern |
| 6,173,898 | B1 | 1/2001 | Mande |
| 6,173,899 | B1 | 1/2001 | Rozin |
| 6,177,859 | B1 | 1/2001 | Tuttle et al. |
| 6,177,860 | B1 | 1/2001 | Cromer et al. |
| 6,179,205 | B1 | 1/2001 | Sloan |
| 6,179,206 | B1 | 1/2001 | Matsumori |
| 6,181,287 | B1 | 1/2001 | Beigel |
| 6,182,895 | B1 | 2/2001 | Albrecht |
| 6,184,788 | B1 | 2/2001 | Middlemiss et al. |
| 6,185,307 | B1 | 2/2001 | Johnson, Jr. |
| 6,188,994 | B1 | 2/2001 | Egendorf |
| 6,189,779 | B1 | 2/2001 | Verdicchio et al. |
| 6,189,787 | B1 | 2/2001 | Dorf |
| 6,189,878 | B1 | 2/2001 | Dorf |
| 6,192,255 | B1 | 2/2001 | Lewis et al. |
| 6,195,006 | B1 | 2/2001 | Bowers et al. |
| 6,196,465 | B1 | 3/2001 | Awano |
| 6,197,396 | B1 | 3/2001 | Haas et al. |
| 6,198,728 | B1 | 3/2001 | Hulyalkar et al. |
| 6,198,762 | B1 | 3/2001 | Krasnov |
| 6,198,875 | B1 | 3/2001 | Edenson et al. |
| 6,199,079 | B1 | 3/2001 | Gupta et al. |
| 6,199,762 | B1 | 3/2001 | Hohle |
| 6,200,272 | B1 | 3/2001 | Linden |
| 6,202,927 | B1 | 3/2001 | Bashan et al. |
| 6,205,151 | B1 | 3/2001 | Quay et al. |
| 6,206,293 | B1 | 3/2001 | Gutman et al. |
| 6,213,390 | B1 | 4/2001 | Oneda |
| 6,213,391 | B1 | 4/2001 | Lewis |
| 6,215,437 | B1 | 4/2001 | Schurmann et al. |
| 6,216,219 | B1 | 4/2001 | Cai et al. |
| 6,219,439 | B1 | 4/2001 | Burger |
| 6,219,639 | B1 | 4/2001 | Bakis et al. |
| 6,220,510 | B1 | 4/2001 | Everett et al. |
| 6,222,914 | B1 | 4/2001 | McMullin |
| D442,627 | S | 5/2001 | Webb et al. |
| D442,629 | S | 5/2001 | Webb et al. |
| 6,223,977 | B1 | 5/2001 | Hill |
| 6,223,984 | B1 | 5/2001 | Renner et al. |
| 6,224,109 | B1 | 5/2001 | Yang |
| 6,226,382 | B1 | 5/2001 | M'Raihi et al. |
| 6,227,424 | B1 | 5/2001 | Roegner |
| 6,227,447 | B1 | 5/2001 | Campisano |
| 6,230,270 | B1 | 5/2001 | Laczko, Sr. |
| 6,232,917 | B1 | 5/2001 | Baumer et al. |
| 6,233,348 | B1 | 5/2001 | Fujii et al. |
| 6,233,683 | B1 | 5/2001 | Chan et al. |
| 6,237,848 | B1 | 5/2001 | Everett |
| 6,239,675 | B1 | 5/2001 | Flaxl |
| 6,240,187 | B1 | 5/2001 | Lewis |
| 6,240,989 | B1 | 6/2001 | Masoud |
| 6,247,030 | B1 | 6/2001 | Suzuki |
| 6,248,199 | B1 | 6/2001 | Smulson |
| 6,248,314 | B1 | 6/2001 | Nakashimada et al. |
| 6,250,554 | B1 | 6/2001 | Leo et al. |
| 6,250,557 | B1 | 6/2001 | Forslund et al. |
| 6,255,031 | B1 | 7/2001 | Yao et al. |
| 6,257,486 | B1 | 7/2001 | Teicher et al. |
| 6,259,769 | B1 | 7/2001 | Page |
| 6,260,026 | B1 | 7/2001 | Tomida et al. |
| 6,260,088 | B1 | 7/2001 | Gove et al. |
| 6,263,316 | B1 | 7/2001 | Khan et al. |
| 6,263,446 | B1 | 7/2001 | Kausik et al. |
| 6,264,106 | B1 | 7/2001 | Bridgelall |
| 6,265,977 | B1 | 7/2001 | Vega et al. |
| 6,266,754 | B1 | 7/2001 | Laczko, Sr. et al. |
| 6,267,292 | B1 | 7/2001 | Walker et al. |
| 6,268,788 | B1 | 7/2001 | Gray |
| 6,269,348 | B1 | 7/2001 | Pare, Jr. et al. |
| 6,273,335 | B1 | 8/2001 | Sloan |
| 6,277,232 | B1 | 8/2001 | Wang et al. |
| 6,282,522 | B1 | 8/2001 | Davis et al. |
| D447,515 | S | 9/2001 | Faenza, Jr. et al. |
| 6,286,763 | B1 | 9/2001 | Reynolds et al. |
| 6,289,324 | B1 | 9/2001 | Kawan |
| 6,290,137 | B1 | 9/2001 | Kiekhaefer |
| 6,293,462 | B1 | 9/2001 | Gangi |
| 6,295,522 | B1 | 9/2001 | Boesch |
| 6,296,188 | B1 | 10/2001 | Kiekhaefer |
| 6,297,727 | B1 | 10/2001 | Nelson, Jr. |
| 6,298,336 | B1 | 10/2001 | Davis et al. |
| 6,304,223 | B1 | 10/2001 | Hilton et al. |
| 6,307,956 | B1 | 10/2001 | Black |
| 6,309,098 | B1 | 10/2001 | Wong |
| 6,315,193 | B1 | 11/2001 | Hogan |
| 6,315,195 | B1 | 11/2001 | Ramacchandran |
| 6,315,206 | B1 | 11/2001 | Hansen et al. |
| 6,317,721 | B1 | 11/2001 | Hurta et al. |
| 6,317,750 | B1 | 11/2001 | Tortolani et al. |
| 6,317,755 | B1 | 11/2001 | Rakers et al. |
| 6,318,636 | B1 | 11/2001 | Reynolds et al. |
| 6,323,566 | B1 | 11/2001 | Meier |
| 6,325,285 | B1 | 12/2001 | Baratelli |
| 6,325,293 | B1 | 12/2001 | Moreno |
| 6,326,934 | B1 | 12/2001 | Kinzie |
| 6,327,573 | B1 | 12/2001 | Walker et al. |
| 6,327,578 | B1 | 12/2001 | Linehan |
| 6,329,920 | B1 | 12/2001 | Morrison et al. |
| 6,330,544 | B1 | 12/2001 | Walker et al. |
| 6,331,972 | B1 | 12/2001 | Harris et al. |
| 6,332,134 | B1 | 12/2001 | Foster |
| 6,332,193 | B1 | 12/2001 | Glass et al. |
| D453,160 | S | 1/2002 | Pentz et al. |
| D453,161 | S | 1/2002 | Pentz |
| 6,336,095 | B1 | 1/2002 | Rosen |
| 6,338,048 | B1 | 1/2002 | Mori |
| 6,339,384 | B1 | 1/2002 | Valdes-Rodriguez |
| 6,341,724 | B2 | 1/2002 | Campisano |
| 6,342,844 | B1 | 1/2002 | Rozin |
| D453,337 | S | 2/2002 | Pentz et al. |
| D453,338 | S | 2/2002 | Pentz et al. |
| D453,516 | S | 2/2002 | Pentz |
| D454,910 | S | 3/2002 | Smith et al. |
| 6,353,420 | B1 | 3/2002 | Chung |
| 6,353,811 | B1 | 3/2002 | Weissman |
| 6,360,953 | B1 | 3/2002 | Lin et al. |
| 6,364,208 | B1 | 4/2002 | Stanford et al. |
| 6,367,011 | B1 | 4/2002 | Lee et al. |
| 6,374,245 | B1 | 4/2002 | Park |
| 6,375,073 | B1 | 4/2002 | Aebi et al. |
| 6,377,034 | B1 | 4/2002 | Ivanov |
| 6,378,073 | B1 | 4/2002 | Davis et al. |
| D457,556 | S | 5/2002 | Hochschild |
| 6,386,444 | B1 | 5/2002 | Sullivan |
| 6,388,533 | B2 | 5/2002 | Swoboda |
| 6,390,375 | B2 | 5/2002 | Kayanakis |
| 6,397,198 | B1 | 5/2002 | Hoffman et al. |
| 6,400,272 | B1 | 6/2002 | Holtzman et al. |
| 6,402,026 | B1 | 6/2002 | Schwier |
| 6,402,028 | B1 | 6/2002 | Graham, Jr. et al. |
| 6,402,029 | B1 | 6/2002 | Gangi |
| 6,404,341 | B1 | 6/2002 | Reid |

6,406,935 B2 6/2002 Kayanakis et al.
6,411,611 B1 6/2002 Van der Tuijn
D460,455 S 7/2002 Pentz
6,415,978 B1 7/2002 McAllister
6,419,158 B2 7/2002 Hooglander
6,421,650 B1 7/2002 Goetz et al.
6,422,462 B1 7/2002 Cohen
6,422,464 B1 7/2002 Terranova
6,422,472 B1 7/2002 Thevenot et al.
6,424,029 B1 7/2002 Giesler
6,424,249 B1 7/2002 Houvener
RE37,822 E 8/2002 Anthonyson
D461,477 S 8/2002 Pentz
6,427,910 B1 8/2002 Barnes et al.
6,434,159 B1 8/2002 Woodward et al.
6,435,415 B1 8/2002 Catte
6,438,235 B2 8/2002 Sims, III
6,439,455 B1 8/2002 Everett et al.
6,442,532 B1 8/2002 Kawan
D462,965 S 9/2002 Pentz
D462,966 S 9/2002 Pentz et al.
6,445,794 B1 9/2002 Shefi
6,446,862 B1 9/2002 Mann
6,457,000 B1 9/2002 Witkowski et al.
6,457,996 B1 10/2002 Shih
6,460,696 B1 10/2002 Meyer
6,466,804 B1 10/2002 Pecen et al.
6,471,127 B2 10/2002 Pentz et al.
6,473,500 B1 10/2002 Risafi et al.
6,480,100 B1 11/2002 Frieden et al.
6,480,101 B1 11/2002 Kelly et al.
6,480,825 B1 11/2002 Sharma et al.
6,480,869 B1 11/2002 Fujioka
6,481,621 B1 11/2002 Herrendoerfer et al.
6,481,623 B1 11/2002 Grant et al.
6,481,632 B2 11/2002 Wentker et al.
6,483,427 B1 11/2002 Werb
6,483,477 B1 11/2002 Plonka
6,483,929 B1 11/2002 Murakami et al.
6,484,937 B1 11/2002 Devaux et al.
6,490,443 B1 12/2002 Freeny, Jr.
6,491,229 B1 12/2002 Berney
6,491,639 B1 12/2002 Turcott
6,494,367 B1 12/2002 Zacharias
6,494,380 B2 12/2002 Jarosz
6,496,594 B1 12/2002 Prokoski
6,501,832 B1 12/2002 Saylor et al.
6,505,772 B1 1/2003 Mollett et al.
6,507,662 B1 1/2003 Brooks
6,507,762 B1 1/2003 Amro et al.
6,510,983 B2 1/2003 Horowitz et al.
6,510,998 B1 1/2003 Stanford et al.
6,513,015 B2 1/2003 Ogasawara
6,519,565 B1 2/2003 Clements et al.
6,520,542 B2 2/2003 Thompson et al.
6,523,292 B2 2/2003 Slavik
6,529,880 B1 3/2003 McKeen et al.
6,535,726 B1 3/2003 Johnson
6,539,101 B1 3/2003 Black
6,546,373 B1 4/2003 Cerra
6,547,133 B1 4/2003 DeVries, Jr. et al.
6,549,912 B1 4/2003 Chen
D474,234 S 5/2003 Nelms et al.
6,560,581 B1 5/2003 Fox et al.
6,575,361 B1 6/2003 Graves et al.
6,577,229 B1 6/2003 Bonneau et al.
6,578,761 B1 6/2003 Spector
6,578,768 B1 6/2003 Binder et al.
6,581,839 B1 6/2003 Lasch et al.
6,587,835 B1 7/2003 Treyz et al.
6,588,660 B1 7/2003 Buescher et al.
6,588,673 B1 7/2003 Chan et al.
6,589,119 B1 7/2003 Orus et al.
6,591,249 B2 7/2003 Zoka
6,598,024 B1 7/2003 Walker et al.
6,601,622 B1 8/2003 Young
6,601,759 B2 8/2003 Fife et al.
6,601,762 B2 8/2003 Piotrowski
6,608,551 B1 8/2003 Anderson et al.
6,608,995 B1 8/2003 Kawasaki et al.
6,609,655 B1 8/2003 Harrell
6,609,656 B1 8/2003 Elledge
6,609,658 B1 8/2003 Sehr
6,615,189 B1 9/2003 Phillips et al.
6,623,039 B2 9/2003 Thompson et al.
6,626,356 B2 9/2003 Davenport et al.
6,628,961 B1 9/2003 Ho et al.
6,629,591 B1 10/2003 Griswold et al.
6,631,849 B2 10/2003 Blossom
6,636,620 B1 10/2003 Hoshino
6,636,833 B1 10/2003 Flitcroft et al.
6,644,551 B2 11/2003 Clayman et al.
6,650,887 B2 11/2003 McGregor et al.
6,651,168 B1 11/2003 Kao et al.
6,651,813 B2 11/2003 Vallans et al.
6,651,892 B2 11/2003 Hooglander
6,657,614 B1 12/2003 Ito et al.
6,662,166 B2 12/2003 Pare, Jr. et al.
6,665,405 B1 12/2003 Lenstra
6,669,086 B2 12/2003 Abdi et al.
6,671,358 B1 12/2003 Seidman et al.
6,674,786 B1 1/2004 Nakamura et al.
6,679,427 B1 1/2004 Kuroiwa
6,681,328 B1 1/2004 Harris et al.
6,681,926 B2 1/2004 De Volpi
6,684,269 B2 1/2004 Wagner
6,685,089 B2 2/2004 Terranova et al.
6,686,847 B1 2/2004 Mittler
6,687,714 B1 2/2004 Kogen et al.
6,687,875 B1 2/2004 Suzuki
6,690,930 B1 2/2004 Dupre
6,693,513 B2 2/2004 Tuttle
6,697,947 B1 2/2004 Matyas, Jr. et al.
6,703,918 B1 3/2004 Kita
6,704,039 B2 3/2004 Pena
6,704,608 B1 3/2004 Azuma
6,705,530 B2 3/2004 Kiekhaefer
6,708,375 B1 3/2004 Johnson
6,711,262 B1 3/2004 Vatanen
6,725,202 B1 4/2004 Hurta et al.
6,732,919 B2 5/2004 Macklin et al.
6,732,936 B1 5/2004 Kiekhaefer
6,735,081 B1 5/2004 Bishop et al.
6,742,120 B1 5/2004 Markakis et al.
6,747,546 B1 6/2004 Hikita et al.
6,749,123 B2 6/2004 Lasch et al.
6,751,805 B1 6/2004 Austion
6,760,581 B2 7/2004 Dutta
6,763,500 B2 7/2004 Black et al.
6,764,014 B2 7/2004 Lasch et al.
6,765,470 B2 7/2004 Shinzaki
6,766,952 B2 7/2004 Luu
6,769,718 B1 8/2004 Warther et al.
6,771,981 B1 8/2004 Zalewski et al.
6,786,400 B1 9/2004 Bucci
6,789,012 B1 9/2004 Childs et al.
6,789,733 B2 9/2004 Terranova et al.
6,793,141 B1 9/2004 Graham
6,799,726 B2 10/2004 Stockhammer
6,805,287 B2 * 10/2004 Bishop et al. ..... 235/379
6,816,058 B2 11/2004 McGregor et al.
6,819,219 B1 11/2004 Bolle et al.
6,823,910 B1 11/2004 Elnekaveh
6,830,193 B2 12/2004 Tanaka
6,834,270 B1 12/2004 Pagani et al.
6,834,795 B1 12/2004 Rasmussen et al.
6,842,106 B2 1/2005 Hughes et al.
6,843,415 B2 1/2005 Vogler
6,845,863 B1 1/2005 Riley
6,845,906 B2 * 1/2005 Royer et al. ..... 235/379
6,851,617 B2 2/2005 Saint et al.
6,853,087 B2 2/2005 Neuhaus et al.
6,853,894 B1 2/2005 Kolls
6,853,987 B1 2/2005 Cook
6,857,566 B2 2/2005 Wankmueller
6,859,672 B2 2/2005 Roberts et al.
6,873,974 B1 3/2005 Schutzer
6,877,097 B2 4/2005 Hamid et al.

6,883,715 B1 4/2005 Fruhauf et al.
6,895,310 B1 5/2005 Kolls
6,898,299 B1 5/2005 Brooks
H2120 H 7/2005 Cudlitz
6,914,517 B2 7/2005 Kinsella
6,915,277 B1 7/2005 Manchester et al.
6,920,560 B2 7/2005 Wallace
6,924,729 B1 8/2005 Aschauer et al.
6,925,439 B1 8/2005 Pitroda
6,925,565 B2 8/2005 Black
6,928,181 B2 8/2005 Brooks
6,931,538 B1 8/2005 Sawaguchi
6,934,861 B2 8/2005 Haala
D509,243 S 9/2005 Hunter, Jr. et al.
6,940,461 B2 9/2005 Nantz et al.
6,944,402 B1 9/2005 Baker et al.
6,944,768 B2 9/2005 Siegel et al.
6,959,874 B2 11/2005 Bardwell
6,961,448 B2 11/2005 Nichols et al.
6,970,583 B2 11/2005 Black
6,978,369 B2 12/2005 Wheeler et al.
6,978,933 B2 12/2005 Yap et al.
6,986,099 B2 1/2006 Todd
6,990,480 B1 1/2006 Burt
6,994,262 B1 2/2006 Warther
7,003,497 B2 2/2006 Maes
7,003,501 B2 2/2006 Ostroff
7,004,385 B1 2/2006 Douglass
7,006,993 B1 2/2006 Cheong et al.
7,049,962 B2 5/2006 Atherton et al.
7,051,925 B2 5/2006 Schwarz, Jr.
7,059,159 B2 6/2006 Lanigan et al.
7,068,148 B2 6/2006 Shanks et al.
7,069,444 B2 6/2006 Lowensohn et al.
7,070,112 B2 7/2006 Beenau et al.
7,093,767 B2 8/2006 Faenza et al.
7,096,204 B1 8/2006 Chen et al.
7,096,494 B1 8/2006 Chen
7,100,821 B2 9/2006 Rasti
7,102,523 B2 9/2006 Shanks et al.
7,103,575 B1 9/2006 Linehan
7,108,190 B2 9/2006 Burgan et al.
7,119,659 B2 10/2006 Bonalle et al.
7,127,672 B1 10/2006 Patterson et al.
7,131,574 B1 11/2006 Sciupac et al.
7,132,946 B2 11/2006 Waldner et al.
7,136,835 B1 11/2006 Flitcroft et al.
7,150,407 B1 12/2006 Berger et al.
7,154,375 B2 12/2006 Beenau et al.
7,171,662 B1 1/2007 Misara et al.
7,172,112 B2 2/2007 Bonalle et al.
7,184,747 B2 2/2007 Bogat
7,213,748 B2 5/2007 Tsuei et al.
7,237,121 B2 6/2007 Cammack et al.
7,239,226 B2 7/2007 Berardi et al.
7,254,557 B1 8/2007 Gillin et al.
7,281,135 B2 10/2007 Black
7,287,271 B1 10/2007 Riggins
7,287,695 B2 10/2007 Wankmueller
7,289,970 B1 10/2007 Siegel
7,299,364 B2 11/2007 Noble et al.
7,303,120 B2 12/2007 Beenau et al.
7,314,164 B2 1/2008 Bonalle et al.
7,314,165 B2 1/2008 Bonalle et al.
7,318,550 B2 1/2008 Bonalle et al.
7,325,724 B2 2/2008 Bonalle et al.
7,341,181 B2 3/2008 Bonalle et al.
7,363,504 B2 4/2008 Bonalle et al.
7,363,505 B2 4/2008 Black
7,419,093 B1 9/2008 Blackson et al.
2001/0003071 A1 6/2001 Mansutti et al.
2001/0013542 A1 8/2001 Horowitz et al.
2001/0013546 A1 8/2001 Ross
2001/0013551 A1 8/2001 Ramachandran
2001/0017584 A1 8/2001 Shinzaki
2001/0018660 A1 8/2001 Sehr
2001/0022446 A1 9/2001 Klure
2001/0024157 A1 9/2001 Hansmann et al.
2001/0029493 A1 10/2001 Pare et al.
2001/0030238 A1 10/2001 Arisawa
2001/0032192 A1 10/2001 Putta et al.
2001/0034565 A1 10/2001 Leatherman
2001/0034623 A1 10/2001 Chung
2001/0034720 A1 10/2001 Armes
2001/0036301 A1 11/2001 Yamaguchi et al.
2001/0036835 A1 11/2001 Leedom, Jr.
2001/0039617 A1 11/2001 Buhrlen et al.
2001/0040507 A1 11/2001 Eckstein et al.
2001/0045469 A1 11/2001 Hooglander
2001/0049628 A1 12/2001 Icho
2001/0053239 A1 12/2001 Takhar
2001/0055411 A1 12/2001 Black
2002/0002468 A1 1/2002 Spagna et al.
2002/0005774 A1 1/2002 Rudolph et al.
2002/0011519 A1 1/2002 Shults
2002/0013765 A1 1/2002 Schwartz
2002/0014529 A1 2/2002 Tanaka
2002/0014952 A1 2/2002 Terranova
2002/0016687 A1 2/2002 Felsenstein et al.
2002/0019807 A1 2/2002 Halpern
2002/0024590 A1 2/2002 Pena
2002/0026419 A1 2/2002 Maritzen et al.
2002/0026575 A1 2/2002 Wheeler et al.
2002/0028704 A1 3/2002 Bloomfield et al.
2002/0030579 A1 3/2002 Albert et al.
2002/0030581 A1 3/2002 Janiak et al.
2002/0035548 A1 3/2002 Hogan et al.
2002/0036237 A1 3/2002 Atherton et al.
2002/0038818 A1 4/2002 Zingher et al.
2002/0040935 A1 4/2002 Weyant
2002/0040936 A1 4/2002 Wentker et al.
2002/0041093 A1 4/2002 Cox et al.
2002/0042782 A1 4/2002 Albazz et al.
2002/0043566 A1 4/2002 Goodman et al.
2002/0046341 A1 4/2002 Kazaks et al.
2002/0052839 A1 5/2002 Takatori
2002/0062249 A1 5/2002 Iannacci
2002/0062284 A1 5/2002 Kawan
2002/0062291 A1 5/2002 Zoka
2002/0066784 A1 6/2002 Segal et al.
2002/0072349 A1 6/2002 Geiselman et al.
2002/0073025 A1 6/2002 Tanner et al.
2002/0074398 A1 6/2002 Lancos et al.
2002/0077837 A1 6/2002 Krueger et al.
2002/0077895 A1 6/2002 Howell
2002/0077992 A1 6/2002 Tobin
2002/0079367 A1 6/2002 Montani
2002/0083320 A1 6/2002 Vatanen
2002/0087869 A1 7/2002 Kim
2002/0092914 A1 7/2002 Pentz et al.
2002/0095298 A1 7/2002 Ewing
2002/0095343 A1 7/2002 Barton et al.
2002/0095389 A1 7/2002 Gaines
2002/0095587 A1 7/2002 Doyle et al.
2002/0095588 A1 7/2002 Shigematsu et al.
2002/0097142 A1 7/2002 Janiak et al.
2002/0097144 A1 7/2002 Collins et al.
2002/0099665 A1 7/2002 Burger et al.
2002/0107007 A1 8/2002 Gerson
2002/0107742 A1 8/2002 Magill
2002/0107791 A1 8/2002 Nobrega et al.
2002/0108062 A1 8/2002 Nakajima et al.
2002/0109580 A1 8/2002 Shreve et al.
2002/0111210 A1 8/2002 Luciano, Jr. et al.
2002/0111917 A1 8/2002 Hoffman et al.
2002/0111919 A1 8/2002 Weller et al.
2002/0112177 A1 8/2002 Voltmer et al.
2002/0113082 A1 8/2002 Leatherman et al.
2002/0116274 A1 8/2002 Hind et al.
2002/0120584 A1 8/2002 Hogan et al.
2002/0125164 A1 9/2002 Bassinson
2002/0126010 A1 9/2002 Trimble et al.
2002/0128977 A1 9/2002 Nambiar et al.
2002/0129248 A1 9/2002 Wheeler et al.
2002/0130186 A1 9/2002 Lasch et al.
2002/0130187 A1 9/2002 Berg et al.
2002/0131567 A1 9/2002 Maginas
2002/0133467 A1 9/2002 Hobson et al.

2002/0133725 A1 9/2002 Roy et al.
2002/0138351 A1 9/2002 Houvener et al.
2002/0138425 A1 9/2002 Shimizu et al.
2002/0138438 A1 9/2002 Bardwell
2002/0139839 A1 10/2002 Catan
2002/0140542 A1 10/2002 Prokoski et al.
2002/0145043 A1 10/2002 Challa et al.
2002/0147002 A1 10/2002 Trop et al.
2002/0147600 A1 10/2002 Waters et al.
2002/0147913 A1 10/2002 Lun Yip
2002/0148892 A1 10/2002 Bardwell
2002/0149467 A1 10/2002 Calvesio et al.
2002/0152123 A1 10/2002 Giordano et al.
2002/0153410 A1 10/2002 Santini
2002/0153424 A1 10/2002 Li
2002/0154795 A1 10/2002 Lee et al.
2002/0158747 A1 10/2002 McGregor et al.
2002/0163421 A1 11/2002 Wang et al.
2002/0165931 A1 11/2002 Greer et al.
2002/0166891 A1 11/2002 Stoutenburg et al.
2002/0166897 A1 11/2002 Hooglander
2002/0169673 A1 11/2002 Prorock et al.
2002/0174067 A1 11/2002 Hoffman et al.
2002/0175805 A9 11/2002 Armstrong et al.
2002/0176522 A1 11/2002 Fan
2002/0178063 A1 11/2002 Gravelle et al.
2002/0178124 A1 11/2002 Lewis
2002/0178369 A1 11/2002 Black
2002/0179704 A1 12/2002 Deaton
2002/0185543 A1 12/2002 Pentz et al.
2002/0186133 A1 12/2002 Loof
2002/0186838 A1 12/2002 Brandys
2002/0188501 A1 12/2002 Lefkowith
2002/0188854 A1 12/2002 Heaven et al.
2002/0188855 A1 12/2002 Nakayama et al.
2002/0190124 A1 12/2002 Piotrowski
2002/0190125 A1 12/2002 Stockhammer
2002/0191816 A1 12/2002 Maritzen et al.
2002/0192856 A1 12/2002 Halope et al.
2002/0193102 A1 12/2002 Hyyppa et al.
2002/0194137 A1 12/2002 Park et al.
2002/0194303 A1 12/2002 Suila et al.
2002/0194503 A1 12/2002 Faith et al.
2002/0196963 A1 12/2002 Bardwell
2003/0001006 A1 1/2003 Lee
2003/0001459 A1 1/2003 Scott
2003/0001755 A1 1/2003 Tiernay et al.
2003/0004866 A1 1/2003 Huennekens et al.
2003/0004881 A1 1/2003 Shinzaki et al.
2003/0005310 A1 1/2003 Shinzaki
2003/0006901 A1 1/2003 Kim et al.
2003/0009382 A1 1/2003 D'Arbeloff et al.
2003/0014307 A1 1/2003 Heng
2003/0014357 A1 1/2003 Chrisekos et al.
2003/0014891 A1 1/2003 Nelms et al.
2003/0018532 A1 1/2003 Dudek et al.
2003/0018567 A1 1/2003 Flitcroft et al.
2003/0018893 A1 1/2003 Hess
2003/0025600 A1 2/2003 Blanchard
2003/0028481 A1 2/2003 Flitcroft et al.
2003/0033697 A1 2/2003 Hicks et al.
2003/0037264 A1 2/2003 Ezaki et al.
2003/0037851 A1 2/2003 Hogganvik
2003/0046228 A1 3/2003 Berney
2003/0046237 A1 3/2003 Uberti
2003/0046540 A1 3/2003 Nakamura et al.
2003/0047482 A1 3/2003 Jones et al.
2003/0054836 A1 3/2003 Michot
2003/0055727 A1 3/2003 Walker et al.
2003/0057226 A1 3/2003 Long
2003/0057278 A1 3/2003 Wong
2003/0061172 A1 3/2003 Robinson
2003/0069828 A1 4/2003 Blazey et al.
2003/0069846 A1 4/2003 Marcon
2003/0074317 A1 4/2003 Hofi
2003/0086591 A1 5/2003 Simon
2003/0093187 A1 5/2003 Walker
2003/0097344 A1 5/2003 Chaum et al.
2003/0106935 A1 6/2003 Burchette, Jr.
2003/0112120 A1 6/2003 K.
2003/0112972 A1 6/2003 Hattick et al.
2003/0115126 A1 6/2003 Pitroda
2003/0120554 A1 6/2003 Hogan et al.
2003/0120626 A1 6/2003 Piotrowski
2003/0121969 A1 7/2003 Wankmueller
2003/0122120 A1 7/2003 Brazis et al.
2003/0123714 A1 7/2003 O'Gorman et al.
2003/0124294 A1 7/2003 Hodson et al.
2003/0125054 A1 7/2003 Garcia
2003/0130820 A1 7/2003 Lane, III
2003/0132132 A1 7/2003 Small
2003/0132284 A1 7/2003 Reynolds et al.
2003/0132297 A1 7/2003 McCall et al.
2003/0140228 A1 7/2003 Binder
2003/0149661 A1 8/2003 Mitchell et al.
2003/0149662 A1 8/2003 Shore
2003/0150911 A1 8/2003 Joseph
2003/0152252 A1 8/2003 Kondo et al.
2003/0153356 A1 8/2003 Liu et al.
2003/0155416 A1 8/2003 Macklin et al.
2003/0159044 A1 8/2003 Doyle et al.
2003/0160074 A1 8/2003 Pineda
2003/0163699 A1 8/2003 Pailles et al.
2003/0167207 A1 9/2003 Berardi et al.
2003/0173408 A1 9/2003 Mosher, Jr. et al.
2003/0177102 A1 9/2003 Robinson
2003/0177347 A1 9/2003 Schneier et al.
2003/0178495 A1 9/2003 Jones et al.
2003/0183689 A1 10/2003 Swift et al.
2003/0183695 A1 10/2003 Labrec et al.
2003/0183699 A1 10/2003 Masui
2003/0187786 A1 10/2003 Swift et al.
2003/0187787 A1 10/2003 Freund
2003/0187790 A1 10/2003 Swift et al.
2003/0187796 A1 10/2003 Swift et al.
2003/0191949 A1 10/2003 Odagawa
2003/0195037 A1 10/2003 Vuong et al.
2003/0195842 A1 10/2003 Reece
2003/0195843 A1 10/2003 Matsuda et al.
2003/0197593 A1 10/2003 Siegel et al.
2003/0200184 A1 10/2003 Dominguez et al.
2003/0208439 A1 11/2003 Rast
2003/0218066 A1 11/2003 Fernandes et al.
2003/0220876 A1 11/2003 Burger et al.
2003/0222153 A1 12/2003 Pentz et al.
2003/0223625 A1 12/2003 Hillhouse et al.
2003/0225623 A1 12/2003 Wankmueller
2003/0225713 A1 12/2003 Atkinson et al.
2003/0226041 A1 12/2003 Palmer et al.
2003/0227550 A1 12/2003 Manico et al.
2003/0229793 A1 12/2003 McCall et al.
2003/0230514 A1 12/2003 Baker
2003/0233334 A1 12/2003 Smith
2003/0236704 A1 12/2003 Antonucci
2004/0006497 A1 1/2004 Nestor et al.
2004/0006539 A1 1/2004 Royer et al.
2004/0010462 A1 1/2004 Moon et al.
2004/0011877 A1 1/2004 Reppermund
2004/0014457 A1 1/2004 Stevens
2004/0015451 A1 1/2004 Sahota et al.
2004/0016796 A1 1/2004 Hanna et al.
2004/0017934 A1 1/2004 Kocher
2004/0019494 A1 1/2004 Ridgeway et al.
2004/0019564 A1 1/2004 Goldthwaite et al.
2004/0020982 A1 2/2004 Hoffman et al.
2004/0021552 A1 2/2004 Koo
2004/0024694 A1 2/2004 Lawrence et al.
2004/0026518 A1 2/2004 Kudo et al.
2004/0029569 A1 2/2004 Khan et al.
2004/0030601 A1 2/2004 Pond et al.
2004/0031856 A1 2/2004 Atsmon et al.
2004/0039814 A1 2/2004 Crabtree et al.
2004/0039860 A1 2/2004 Mills et al.
2004/0041021 A1 3/2004 Nugent, Jr.
2004/0041690 A1 3/2004 Yamagishi
2004/0044627 A1 3/2004 Russell et al.
2004/0046034 A1 3/2004 Ey Yamani et al.
2004/0049687 A1 3/2004 Orsini 2004/0050930 A1 3/2004 Rowe
2004/0052406 A1 3/2004 Brooks
2004/0059923 A1 3/2004 ShamRao
2004/0061593 A1 4/2004 Lane
2004/0062423 A1 4/2004 Doi
2004/0073792 A1 4/2004 Noble et al.
2004/0083184 A1 4/2004 Tsuei et al.
2004/0083380 A1 4/2004 Janke
2004/0084524 A1 5/2004 Ramachandran
2004/0089724 A1 5/2004 Lasch et al.
2004/0098336 A1 5/2004 Flink
2004/0104266 A1 6/2004 Bolle et al.
2004/0104268 A1 6/2004 Bailey
2004/0118930 A1 6/2004 Berardi et al.
2004/0124104 A1 7/2004 DeVolpi
2004/0124246 A1 7/2004 Allen et al.
2004/0127256 A1 7/2004 Goldthwaite et al.
2004/0129787 A1 7/2004 Saito et al.
2004/0131237 A1 7/2004 Machida
2004/0133787 A1 7/2004 Doughty et al.
2004/0136573 A1 7/2004 Sato
2004/0139021 A1 7/2004 Reed et al.
2004/0144841 A1 7/2004 Tsukamoto et al.
2004/0144846 A1 7/2004 Lasch et al.
2004/0149820 A1 8/2004 Zuili
2004/0155101 A1 8/2004 Royer et al.
2004/0158723 A1 8/2004 Root
2004/0160310 A1 8/2004 Chen et al.
2004/0161135 A1 8/2004 Sano et al.
2004/0165753 A1 8/2004 Takhiri et al.
2004/0169071 A1 9/2004 Burgan et al.
2004/0172541 A1 9/2004 Ando et al.
2004/0176071 A1 9/2004 Gehrmann et al.
2004/0177045 A1 9/2004 Brown
2004/0180657 A1 9/2004 Yaqub et al.
2004/0188519 A1 9/2004 Cassone
2004/0190757 A1 9/2004 Murphy et al.
2004/0193676 A1 9/2004 Marks
2004/0195314 A1 10/2004 Lee
2004/0199469 A1 10/2004 Barillova et al.
2004/0202354 A1 10/2004 Togino
2004/0208343 A1 10/2004 Golden et al.
2004/0215575 A1 10/2004 Garrity
2004/0222803 A1 11/2004 Tartagni
2004/0230488 A1 11/2004 Beenau et al.
2004/0232220 A1 11/2004 Beenau et al.
2004/0232224 A1 11/2004 Beenau et al.
2004/0233039 A1 11/2004 Beenau et al.
2004/0235450 A1 11/2004 Rosenberg
2004/0236680 A1 11/2004 Luoffo et al.
2004/0236699 A1 11/2004 Beenau et al.
2004/0236700 A1 11/2004 Beenau et al.
2004/0236701 A1 11/2004 Beenau et al.
2004/0236819 A1 11/2004 Anati et al.
2004/0239480 A1 12/2004 Beenau et al.
2004/0240711 A1 12/2004 Hamza et al.
2004/0255168 A1 12/2004 Murashita et al.
2004/0257196 A1 12/2004 Kotzin
2004/0258282 A1 12/2004 Bjorn et al.
2005/0001711 A1 1/2005 Doughty et al.
2005/0004921 A1 1/2005 Beenau et al.
2005/0005172 A1 1/2005 Haala
2005/0011776 A1 1/2005 Nagel
2005/0017068 A1 1/2005 Zalewski et al.
2005/0018658 A1 1/2005 Ikeda et al.
2005/0020304 A1 1/2005 Shinzaki
2005/0021457 A1 1/2005 Johnson et al.
2005/0023157 A1 2/2005 Logan
2005/0033687 A1 2/2005 Beenau et al.
2005/0033688 A1 2/2005 Peart et al.
2005/0033689 A1 2/2005 Bonalle et al.
2005/0033992 A1 2/2005 Inabe
2005/0035192 A1 2/2005 Bonalle et al.
2005/0035847 A1 2/2005 Bonalle et al.
2005/0036665 A1 2/2005 Higuchi
2005/0038718 A1 2/2005 Barnes et al.
2005/0040221 A1 2/2005 Schwarz, Jr.
2005/0040272 A1 2/2005 Argumedo et al.
2005/0045718 A1 3/2005 Bortolin et al.
2005/0050367 A1 3/2005 Burger et al.
2005/0054438 A1 3/2005 Rothschild et al.
2005/0058262 A1 3/2005 Timmins et al.
2005/0060233 A1 3/2005 Bonalle et al.
2005/0065842 A1 3/2005 Summers
2005/0065872 A1 3/2005 Moebs et al.
2005/0071231 A1 3/2005 Beenau et al.
2005/0087597 A1 4/2005 Gotfried et al.
2005/0091325 A1 4/2005 Kuwana et al.
2005/0097038 A1 5/2005 Yu et al.
2005/0098621 A1 5/2005 deSylva
2005/0100199 A1 5/2005 Boshra
2005/0102524 A1 5/2005 Haala
2005/0103839 A1 5/2005 Hewel
2005/0109836 A1 5/2005 Ben-Aissa
2005/0113137 A1 5/2005 Rodriguez et al.
2005/0116024 A1 6/2005 Beenau et al.
2005/0119978 A1 6/2005 Ates
2005/0121512 A1 6/2005 Wankmueller
2005/0122209 A1 6/2005 Black
2005/0123137 A1 6/2005 McCallum
2005/0125312 A1 6/2005 Dearing et al.
2005/0125317 A1 6/2005 Winkelman, III et al.
2005/0125343 A1 6/2005 Mendelovich
2005/0127164 A1 6/2005 Wankmueller
2005/0137977 A1 6/2005 Wankmueller
2005/0139669 A1 6/2005 Arnouse
2005/0144133 A1 6/2005 Hoffman et al.
2005/0149358 A1 7/2005 Sacco et al.
2005/0149926 A1 7/2005 Saltz
2005/0160271 A9 7/2005 Brundage et al.
2005/0160790 A1 7/2005 Tanaka et al.
2005/0165684 A1 7/2005 Jensen et al.
2005/0166062 A1 7/2005 Sanchez-Cifuentes
2005/0169504 A1 8/2005 Black
2005/0171787 A1 8/2005 Zagami
2005/0171905 A1 8/2005 Wankmueller
2005/0180618 A1 8/2005 Black
2005/0187883 A1 8/2005 Bishop et al.
2005/0187916 A1 8/2005 Levin et al.
2005/0197923 A1 9/2005 Kilner et al.
2005/0203857 A1 9/2005 Friedman
2005/0207002 A1 9/2005 Liu et al.
2005/0211784 A1 9/2005 Justin
2005/0212657 A1 9/2005 Simon
2005/0216424 A1 9/2005 Gandre et al.
2005/0221853 A1 10/2005 Silvester
2005/0223230 A1 10/2005 Zick
2005/0232471 A1 10/2005 Baer
2005/0240778 A1 10/2005 Saito
2005/0246292 A1 11/2005 Sarcanin
2005/0251688 A1 11/2005 Nanavati et al.
2005/0261972 A1 11/2005 Black
2005/0275505 A1 12/2005 Himmelstein
2005/0278222 A1 12/2005 Northrup
2006/0000892 A1 1/2006 Bonalle et al.
2006/0000893 A1 1/2006 Bonalle et al.
2006/0000894 A1 1/2006 Bonalle et al.
2006/0000895 A1 1/2006 Bonalle et al.
2006/0000896 A1 1/2006 Bonalle et al.
2006/0000897 A1 1/2006 Bonalle et al.
2006/0000898 A1 1/2006 Bonalle et al.
2006/0000899 A1 1/2006 Bonalle et al.
2006/0005022 A1 1/2006 Wakamori et al.
2006/0005042 A1 1/2006 Black
2006/0016868 A1 1/2006 Bonalle et al.
2006/0016869 A1 1/2006 Bonalle et al.
2006/0016871 A1 1/2006 Bonalle et al.
2006/0016874 A1 1/2006 Bonalle et al.
2006/0016875 A1 1/2006 Bonalle et al.
2006/0016877 A1 1/2006 Bonalle et al.
2006/0033609 A1 2/2006 Bridgelall
2006/0034492 A1 2/2006 Siegel et al.
2006/0066444 A1 3/2006 Steeves
2006/0069635 A1 3/2006 Ram et al.
2006/0071756 A1 4/2006 Steeves
2006/0077034 A1 4/2006 Hillier
2006/0080552 A1 4/2006 Lauper
2006/0095369 A1 5/2006 Hofi

| | | | |
|---|---|---|---|
| 2006/0104485 | A1 | 5/2006 | Miller et al. |
| 2006/0123240 | A1 | 6/2006 | Chaiken |
| 2006/0136336 | A1 | 6/2006 | Drummond et al. |
| 2006/0156395 | A1 | 7/2006 | Fontaine |
| 2006/0158434 | A1 | 7/2006 | Zank et al. |
| 2006/0173291 | A1 | 8/2006 | Glossop |
| 2006/0173791 | A1 | 8/2006 | Mann et al. |
| 2006/0177061 | A1 | 8/2006 | Orsini et al. |
| 2006/0178937 | A1 | 8/2006 | Rau et al. |
| 2006/0190419 | A1 | 8/2006 | Bunn et al. |
| 2006/0202835 | A1 | 9/2006 | Thibault |
| 2006/0208066 | A1 | 9/2006 | Finn et al. |
| 2006/0213986 | A1 | 9/2006 | Register et al. |
| 2006/0229988 | A1 | 10/2006 | Oshima et al. |
| 2006/0237528 | A1 | 10/2006 | Bishop et al. |
| 2006/0242423 | A1 | 10/2006 | Kussmaul |
| 2006/0278723 | A1 | 12/2006 | Dan et al. |
| 2007/0008131 | A1 | 1/2007 | Doan et al. |
| 2007/0046468 | A1 | 3/2007 | Davis |
| 2007/0057797 | A1 | 3/2007 | Waldner et al. |
| 2007/0075841 | A1 | 4/2007 | Maltsev et al. |
| 2007/0112957 | A1 | 5/2007 | Shastri et al. |
| 2007/0119924 | A1 | 5/2007 | Register et al. |
| 2007/0241861 | A1 | 10/2007 | Venkatanna et al. |
| 2007/0252001 | A1 | 11/2007 | Kail et al. |
| 2007/0252010 | A1 | 11/2007 | Gonzalez et al. |
| 2007/0284432 | A1 | 12/2007 | Abouyounes |
| 2007/0296544 | A1 | 12/2007 | Beenau et al. |
| 2007/0296551 | A1 | 12/2007 | Beenau et al. |
| 2007/0299782 | A1 | 12/2007 | Beenau et al. |
| 2007/0299783 | A1 | 12/2007 | Beenau et al. |
| 2008/0006691 | A1 | 1/2008 | Bonalle et al. |
| 2008/0008359 | A1 | 1/2008 | Beenau et al. |
| 2008/0008363 | A1 | 1/2008 | Bonalle et al. |
| 2008/0010214 | A1 | 1/2008 | Bonalle et al. |
| 2008/0011830 | A1 | 1/2008 | Bonalle et al. |
| 2008/0011831 | A1 | 1/2008 | Bonalle et al. |
| 2008/0013796 | A1 | 1/2008 | Bonalle et al. |
| 2008/0013807 | A1 | 1/2008 | Bonalle et al. |
| 2008/0015941 | A1 | 1/2008 | Beenau et al. |
| 2008/0015992 | A1 | 1/2008 | Bonalle et al. |
| 2008/0015993 | A1 | 1/2008 | Bonalle et al. |
| 2008/0015994 | A1 | 1/2008 | Bonalle et al. |
| 2008/0016002 | A1 | 1/2008 | Beenau et al. |
| 2008/0033722 | A1 | 2/2008 | Beenau et al. |
| 2008/0067242 | A1 | 3/2008 | Bonalle et al. |
| 2008/0072065 | A1 | 3/2008 | Bonalle et al. |

FOREIGN PATENT DOCUMENTS

| | | |
|---|---|---|
| CH | 689070 | 8/1997 |
| CH | 689680 | 8/1999 |
| DE | 2847756 | 5/1980 |
| DE | 3636921 | 5/1981 |
| DE | 3941070 | 6/1991 |
| DE | 4339460 | 11/1993 |
| DE | 29702538 | 4/1997 |
| DE | 19741726 | 9/1997 |
| DE | 10203926 | 1/2002 |
| EP | 0181770 | 5/1986 |
| EP | 0343829 | 11/1989 |
| EP | 0354817 | 2/1990 |
| EP | 0358525 | 3/1990 |
| EP | 0368570 | 5/1990 |
| EP | 0388090 | 9/1990 |
| EP | 0424726 | 10/1990 |
| EP | 0403134 | 12/1990 |
| EP | 0411602 | 2/1991 |
| EP | 0473998 | 3/1992 |
| EP | 0481388 | 4/1992 |
| EP | 0531605 | 3/1993 |
| EP | 0552047 | 7/1993 |
| EP | 0560318 | 9/1993 |
| EP | 0568185 | 11/1993 |
| EP | 0657297 | 6/1995 |
| EP | 0721850 | 7/1996 |
| EP | 0735505 | 10/1996 |
| EP | 0780839 | 6/1997 |
| EP | 0789316 | 8/1997 |
| EP | 0854461 | 7/1998 |
| EP | 0866420 | 9/1998 |
| EP | 0894620 | 2/1999 |
| EP | 0916519 | 5/1999 |
| EP | 0917120 | 5/1999 |
| EP | 0927945 | 7/1999 |
| EP | 0933717 | 8/1999 |
| EP | 0949595 | 10/1999 |
| EP | 0956818 | 11/1999 |
| EP | 0959440 | 11/1999 |
| EP | 0984404 | 3/2000 |
| EP | 1016947 | 7/2000 |
| EP | 1017030 | 7/2000 |
| EP | 1039403 | 9/2000 |
| EP | 1104909 | 6/2001 |
| EP | 1113387 | 7/2001 |
| EP | 1115095 | 7/2001 |
| EP | 1199684 | 4/2002 |
| EP | 1251450 | 10/2002 |
| EP | 1345146 | 9/2003 |
| EP | 1610273 | 12/2005 |
| GB | 1371254 | 10/1974 |
| GB | 2088110 | 6/1982 |
| GB | 2108906 | 5/1983 |
| GB | 2240948 | 8/1991 |
| GB | 2281714 | 3/1995 |
| GB | 2347537 | 9/2000 |
| GB | 2350021 | 11/2000 |
| GB | 2361790 | 10/2001 |
| JP | 61-100436 | 5/1986 |
| JP | 62-043774 | 3/1987 |
| JP | 62-264999 | 11/1987 |
| JP | 63-071794 | 4/1988 |
| JP | 63-098689 | 4/1988 |
| JP | 63-072721 | 5/1988 |
| JP | 63-175987 | 7/1988 |
| JP | 64-004934 | 1/1989 |
| JP | 64-087395 | 3/1989 |
| JP | 64-087396 | 3/1989 |
| JP | 64-087397 | 3/1989 |
| JP | 02-130737 | 5/1990 |
| JP | 02-252149 | 10/1990 |
| JP | 03-290780 | 12/1991 |
| JP | 42-005596 | 7/1992 |
| JP | 04-303692 | 10/1992 |
| JP | 05-069689 | 3/1993 |
| JP | 05-254283 | 10/1993 |
| JP | 06-183187 | 7/1994 |
| JP | 06-191137 | 7/1994 |
| JP | 06-234287 | 8/1994 |
| JP | 07-173358 | 7/1995 |
| JP | 07-205569 | 8/1995 |
| JP | 08-244385 | 9/1996 |
| JP | 08-324163 | 12/1996 |
| JP | 09-050505 | 2/1997 |
| JP | 09-052240 | 2/1997 |
| JP | 09-274640 | 10/1997 |
| JP | 10-129161 | 5/1998 |
| JP | 10-289296 | 10/1998 |
| JP | 10302160 | 11/1998 |
| JP | 10-334206 | 12/1998 |
| JP | 10-340231 | 12/1998 |
| JP | 11-175640 | 7/1999 |
| JP | 11-227367 | 8/1999 |
| JP | 11-353425 | 12/1999 |
| JP | 2000-011109 | 1/2000 |
| JP | 2000-015288 | 1/2000 |
| JP | 2000-040181 | 2/2000 |
| JP | 2000-048153 | 2/2000 |
| JP | 2000-067312 | 3/2000 |
| JP | 2000-163538 | 6/2000 |
| JP | 2000-177229 | 6/2000 |
| JP | 2000-194799 | 7/2000 |
| JP | 2000-207641 | 7/2000 |
| JP | 2000-222176 | 8/2000 |
| JP | 2000-252854 | 9/2000 |
| JP | 2001-005931 | 1/2001 |
| JP | 2001-504406 | 4/2001 |
| JP | 2001-134536 | 5/2001 |
| JP | 2001-160105 | 6/2001 |

| | | |
|---|---|---|
| JP | 2001-283122 | 10/2001 |
| JP | 2001-315475 | 11/2001 |
| JP | 2002-032687 | 1/2002 |
| JP | 2002-109584 | 4/2002 |
| JP | 2002-133335 | 5/2002 |
| JP | 2002-133336 | 5/2002 |
| JP | 2002-157530 | 5/2002 |
| JP | 2002-163585 | 6/2002 |
| JP | 2002-183443 | 6/2002 |
| JP | 2002-274087 | 9/2002 |
| JP | 2003-288646 | 10/2003 |
| JP | 2004-164347 | 6/2004 |
| JP | 2004-348478 | 12/2004 |
| WO | WO 81/00776 | 3/1981 |
| WO | WO 89/03760 | 5/1989 |
| WO | WO 90/08661 | 8/1990 |
| WO | WO 91/08910 | 6/1991 |
| WO | WO 92/16913 | 10/1992 |
| WO | WO 95/32919 | 12/1995 |
| WO | WO 95/35546 | 12/1995 |
| WO | WO 96/06409 | 2/1996 |
| WO | WO 96/18972 | 6/1996 |
| WO | WO 97/09688 | 3/1997 |
| WO | WO 97/40459 | 10/1997 |
| WO | WO 98/21683 | 5/1998 |
| WO | WO 98/22291 | 5/1998 |
| WO | WO 98/45778 | 10/1998 |
| WO | WO 99/03057 | 1/1999 |
| WO | WO 99/12136 | 3/1999 |
| WO | WO 99/14055 | 3/1999 |
| WO | WO 99/21321 | 4/1999 |
| WO | WO 99/27492 | 6/1999 |
| WO | WO 99/40548 | 8/1999 |
| WO | WO 99/47983 | 9/1999 |
| WO | WO 99/49424 | 9/1999 |
| WO | WO 00/10144 | 2/2000 |
| WO | WO 00/38088 | 6/2000 |
| WO | WO 00/49586 | 8/2000 |
| WO | WO 00/73989 | 12/2000 |
| WO | WO 01/04825 | 1/2001 |
| WO | WO 01/13320 | 2/2001 |
| WO | WO 01/15098 | 3/2001 |
| WO | WO 01/18745 | 3/2001 |
| WO | WO 01/25872 | 4/2001 |
| WO | WO 01/43095 | 6/2001 |
| WO | WO 01/55955 | 8/2001 |
| WO | WO 01/72224 | 10/2001 |
| WO | WO 01/77856 | 10/2001 |
| WO | WO 01/78024 | 10/2001 |
| WO | WO 01/80473 | 10/2001 |
| WO | WO 01/86535 | 11/2001 |
| WO | WO 01/86599 | 11/2001 |
| WO | WO 01/90962 | 11/2001 |
| WO | WO 01/95243 | 12/2001 |
| WO | WO 02/01485 | 1/2002 |
| WO | WO 02/13134 | 2/2002 |
| WO | WO 02/063545 | 8/2002 |
| WO | WO 02/065246 | 8/2002 |
| WO | WO 02/065404 | 8/2002 |
| WO | WO 02/067190 | 8/2002 |
| WO | WO 02/069221 | 9/2002 |
| WO | WO 02/073512 | 9/2002 |
| WO | WO 02/086665 | 10/2002 |
| WO | WO 02/091281 | 11/2002 |
| WO | WO 02/097575 | 12/2002 |
| WO | WO 02/101670 | 12/2002 |
| WO | WO 03/007623 | 1/2003 |
| WO | WO 2004/052657 | 6/2004 |

OTHER PUBLICATIONS

"Physical Reality: A Second Look", Ken Sharp, Senior Technical Editor, http://www.idsystems.com/reader/1999_03/phys0399_pt2/phys0399_pt2.htm (6 pages).
Prophecy Central Update #9, Oct. 10, 1997, http://www.bible-prophecy.com/pcu9.htm (5 pages).
"RFID Smart Cards Gain Ground: The convenience of contactless transactions is driving widespread adoption of contactless smart cards", RFID Journal, Apr. 9, 2003.
Functional Specification, Standard Card IC MF1 IC S50, Philips Semiconductors, Product Specification Rev. 5.1 May 2001.
USBanker, Article 5, 1995, http://www.banking.com/us-banker/art5.
Financial Technology International Bulletin, V14, n1, p4, Sep. 1996.
Greene, Thomas C., "American Express Offers temporary CC numbers for the web," Sep. 9, 2000, The Register, www.theregister.co.uk.
CNN.com, U.S. News, "American Express to offer disposable credit card numbers," Sep. 8, 2000, Associated Press, www.cnn.com.
American Express, "Private PaymentsSM ; A New Level of Security from American Express," American Express Website, Cards.
Martin, Zack, "One-Time Numbers Stop Web Hackers From Pilfering Data," Jan. 2001, Card Marketing, Thomson Financial, www.c rdf rum.com.
The Dollar Stretcher, "Disposable Credit Card Numbers," Jan. 2001, CardRatings.org, www.stretcher.com.
ISO/IEC 7816-6:1996(E)—First Edition—May 15, 1996.
ISO/IEC 7816-4:1995(E)—First Edition—Sep. 1, 1995.
"Biometrics: Speaker Verification", by Kulkarni, et al., http://biometrics.cse.msu.edu/speaker.html, Mar. 8, 2004, 5 pages.
"Judge Dismisses FTC Suit Against Rambus", Evers, IDG New Service, http://www.infoworld.com/article/04/02/18/HNjudgedismisses_1.html, Feb. 18, 2004, 3 pages.
"Credit on Your Key Ring, Buy Gas at Mobil, Exxon and Soon Burgers at McDonald's", by Krakow, MSNBC, http://www.msnbc.msn.com/id/3072638, Feb. 17, 2004, 4 pages.
"The Evolution of Mobile Payment", by McPherson, Financial Insights, Feb. 2, 2004, http://www.banktech.com./story/mews/showArticle/jhtml?article ID=17601432, 2 pages.
"Pay by Touch Press Releases", http://www.paybytouch.com/press.html, Feb. 10, 2004, 3 pages.
"Putting Their Finger on It", by Wilson, http://sanfrancisco.bizjournals.com/sanfrancisco/stories/2003/10/20/story6.html?t=printable, Feb. 9, 2004, 2 pages.
"TI Embraces Prox Card Standard", by Roberti, Mar. 6, 2003, http://www.ti.com/tiris/docs/in-the-news/2003/3-6-03.shtml, 2 pages.
"Paying It By Ear", The Guardian, Jan. 18, 2003, http://money.guardian.co.uk/creditanddebt/creditcards/story/0,1456,876908,00.html, 3 pages.
Pay by Touch—Company, http://www.paybytouch.com/company.html.
"Identix Inc.—Empowering Identification™—Understanding Biometrics", http://www.identix.com/newsroom/news_biometrics_face.html, 1 page.
"International Biometric Group—Signature Biometrics: How It Works", http://www.ibgweb.com./reports/public/reports/signature-scan_tech.html, Feb. 18, 2004, 1 page.
"International Biometric Group—Voice Recognition Technology: How It Works", http://www.ibgweb.com/reports/public/reports/voice-scan_tech.html, Feb. 18, 2004, 1 page.
"The Henry Classification System", International Biometric Group, 7 pages.
"Individual Biometrics—Hand Geometry", http://ctl.ncsc.dni.us/biomet%20web/BMHand.html, Feb. 18, 2004, 2 pages.
"Individual Biometrics—Retinal Scan", http:ctl.ncsc.dni.us/biomet%20web/BMRetinal.html, Feb. 18, 2004, 2 pages.
"Individual Biometrics—Iris Scan", http:ctl.ncsc.dni.us/biomet%20web/BMIris.html, Feb. 18, 2004, 2 pages.
"Individual Biometrics—Vascular Patterns", http:ctl.ncsc.dni.us/biomet%20web/BMVascular.html, Feb. 18, 2004, 1 page.
"Fingerprint Technology—Indentix Inc.— Empowering Identification™—Understanding Biometrics", http://www.identix.com/newsroom/news_biometrics_finger.html, Feb. 18, 2004, 1.
"Individual Biometrics—Facial Recognition", http:ctl.ncsc.dni.us/biomet%20web/BMfacial.html, Feb. 18, 2004, 2 pages.
"Fingerprint Analysis—The Basics", http://www.crimtrac.gov.au/fingerprintanalysis.htm, Feb. 18, 2004, 3 pages.
"Visual Speech and Speaker Recognition", by Luettin, Jun. 30, 2000, http://herens.idiap.ch/~luettin/luettin-thesis.bib.abs.html, 1 page.
"Automatic Ear Recognition by Force Field Transformations", by Hurley, et al., The Institution of Electrical Engineers, 2000, pp. 7/1-7/5.
"Everything You Need to Know About Biometrics", by Bowman, Identix Croproation, Jan. 2000, 8 pages.

"How Fingerprint Scanners Work", by Harris, http:computer.howstuffworks.com/fingerprint-scanner.htm/printable, Feb. 18, 2004, 6 pages.
"How Facial Recognition Systems Work", by Bonsor, http://computer.howstuffworks.com/facial-recognition.htm/printable, Feb. 18, 2004, 6 pages.
"Biometrics: Hand Geometry", by Ross, et al., http://biometrics.cse.msu.edu/hand_geometry.html, Feb. 26, 2004, 2 pages.
"Biometric Person Authentication: Odor", by Korotkaya, Department of Information Technology, Laboratory of Applied Mathematics, Lappeenranta University of Technology, 18 pages.
"ISO Magnetic Stripe Card Standards", http://www.cyberd.co.uk/support/technotes/ioscards.htm, Feb. 9, 2004, 4 pages.
"Smart Card Developer's Kit: Some Basic Standards for Smart Cards", http:unix.be.eu.org/docs/smart-card-developer-kit/ch03/033-035.html, Feb. 9, 2004, 2 pages.
"Smart Card Technology and Applications"; http://disc.cba.uh.edu/~rhirsch/fall96/lara.htm (8 pages).
Goldman, J., "Internet Security, The Next Generation, When Software Encryption is not Enough," Web Techniques, Nov. 1997, pp. 43-46.
Simmons, J., "Smart Cards Hold the Key to Secure Internet Commerce," EC World, Dec. 1998, pp. 36-38.
Wayner, P., "Digital Cash," AP Professional, 1996, pp. 76-83, 85-100.
"ISO Standards," available from http://www.iso.ch/projects/loading.html.
Turban, et al., "Using Smartcards in Electronic Commerce," Proc. 31st Annual Hawaii Inter. Conf. on System Sciences, vol. 4, 1998, pp. 62-69.
Dhem, et al., "Scalps: Smart Card for Limited Payment Systems," IEEE Micro, Jun. 1996, pp. 42-51.
EPO Communication dated Jun. 30, 2010 for European Patent Application No. 02780443.4.
Supplemental Search Report dated May 26, 2006 for EP03763325.2.
Examination Report dated Oct. 26, 2006 for EP03763325.2.
Office Action dated Aug. 3, 2006 in JP2004-562629.
Office Action dated Mar. 8, 2007 in JP2004-562629.
Final Office Action dated Oct. 4, 2007 in JP2004-562629.
ISR dated Apr. 22, 2004 for PCT/US03/21279.
Office Action dated Oct. 4, 2007 for JP2007-026166.
Non-Final Office Action issued Mar. 26, 2008 in U.S. Appl. No. 10/905,005.
Non-Final Office Action issued Nov. 1, 2006 in U.S. Appl. No. 10/905,006.
Notice of Allowance issued Jul. 12, 2007 in U.S. Appl. No. 10/905,006.
Non-Final Office Action issued Jun. 20, 2006 in U.S. Appl. No. 10/318,480.
Notice of Allowance issued Jan. 24, 2007 in U.S. Appl. No. 10/318,480.
Supplemental Notice of Allowance issued Mar. 13, 2007 in U.S. Appl. No. 10/318,480.
ISR dated Apr. 22, 2004 for PCT/US03/21447.
Non-Final Office Action issued Nov. 22, 2005 in U.S. Appl. No. 10/876,822.
Final Office Action issued Aug. 3, 2006 in U.S. Appl. No. 10/876,822.
Non-Final Office Action issued Feb. 6, 2007 in U.S. Appl. No. 10/876,822.
Final Office Action issued Jul. 18, 2007 in U.S. Appl. No. 10/876,822.
Non-Final Office Action issued Jan. 28, 2008 in U.S. Appl. No. 10/876,822.
Final Office Action issued Aug. 22, 2008 in U.S. Appl. No. 10/876,822.
Non-Final Office Action issued Mar. 23, 2006 in U.S. Appl. No. 10/318,432.
Restriction Requirement issued Jan. 17, 2007 in U.S. Appl. No. 10/318,432.
Non-Final Office Action issued May 1, 2007 in U.S. Appl. No. 10/318,432.
Non-Final Office Action issued Dec. 13, 2007 in U.S. Appl. No. 10/318,432.
Non-Final Office Action issued Jun. 27, 2008 in U.S. Appl. No. 10/318,432.
ISR dated Apr. 22, 2004 for PCT/US03/21280.
Non-Final Office Action issued Mar. 10, 2008 in U.S. Appl. No. 11/160,627.
Final Office Action issued Jun. 24, 2008 in U.S. Appl. No. 11/160,627.
Advisory Action issued Aug. 6, 2008 in U.S. Appl. No. 11/160,627.
Restriction Requirement issued Apr. 30, 2008 in U.S. Appl. No. 11/160,548.
Non-Final Office Action issued Aug. 21, 2008 in U.S. Appl. No. 11/160,548.
Non-Final Office Action issued Jul. 8, 2005 in U.S. Appl. No. 10/708,839.
Final Office Action issued Nov. 21, 2005 in U.S. Appl. No. 10/708,839.
Advisory Action issued Feb. 9, 2006 in U.S. Appl. No. 10/708,839.
Non-Final Office Action issued May 2, 2006 in U.S. Appl. No. 10/708,839.
Final Office Action issued Jan. 25, 2007 in U.S. Appl. No. 10/708,839.
Notice of Abandonment issued Oct. 11, 2007 in U.S. Appl. No. 10/708,839.
Non-Final Office Action issued Sep. 7, 2006 in U.S. Appl. No. 10/708,585.
Notice of Allowance issued May 11, 2007 in U.S. Appl. No. 10/708,585.
Non-Final Office Action issued Nov. 28, 2005 in U.S. Appl. No. 10/708,823.
Final Office Action issued May 11, 2006 in U.S. Appl. No. 10/708,823.
Notice of Abandonment issued Jan. 5, 2007 in U.S. Appl. No. 10/708,823.
Non-Final Office Action issued May 13, 2008 in U.S. Appl. No. 10/708,545.
ISR/WO dated Aug. 19, 2008 for PCT/US05/07905.
Non-Final Office Action issued Sep. 7, 2006 in U.S. Appl. No. 10/708,550.
Notice of Allowance issued May 11, 2007 in U.S. Appl. No. 10/708,550.
ISR/WO dated Feb. 16, 2007 for PCT/US05/36848.
IPRP (Ch 1) dated Apr. 26, 2007 for PCT/US05/36848.
Non-Final Office Action issued Apr. 4, 2007 in U.S. Appl. No. 10/711,965.
Non-Final Office Action issued Oct. 16, 2007 in U.S. Appl. No. 10/711,965.
Non-Final Office Action issued Sep. 19, 2006 in U.S. Appl. No. 10/710,311.
Notice of Abandonment issued Jun. 28, 2007 in U.S. Appl. No. 10/710,311.
Non-Final Office Action issued Feb. 9, 2006 in U.S. Appl. No. 10/710,315.
Final Office Action issued Jul. 13, 2006 in U.S. Appl. No. 10/710,315.
Notice of Abandonment issued Apr. 20, 2007 in U.S. Appl. No. 10/710,315.
Non-Final Office Action issued Feb. 9, 2006 in U.S. Appl. No. 10/710,317.
Final Office Action issued Jul. 18, 2006 in U.S. Appl. No. 10/710,317.
Notice of Abandonment issued Mar. 22, 2007 in U.S. Appl. No. 10/710,317.
Non-Final Office Action issued Sep. 19, 2006 in U.S. Appl. No. 10/710,319.
Notice of Abandonment issued Aug. 9, 2007 in U.S. Appl. No. 10/710,319.
Non-Final Office Action issued Mar. 9, 2006 in U.S. Appl. No. 10/710,323.
Notice of Abandonment issued Dec. 12, 2006 in U.S. Appl. No. 10/710,323.

Non-Final Office Action issued Oct. 10, 2006 in U.S. Appl. No. 10/710,324.
Notice of Abandonment issued Oct. 11, 2007 in U.S. Appl. No. 10/710,324.
Non-Final Office Action issued Oct. 10, 2006 in U.S. Appl. No. 10/710,325.
Notice of Abandonment issued Jun. 4, 2007 in U.S. Appl. No. 10/710,325.
Non-Final Office Action issued Mar. 22, 2006 in U.S. Appl. No. 10/710,326.
Final Office Action issued Oct. 10, 2006 in U.S. Appl. No. 10/710,326.
Advisory Action issued Jan. 12, 2007 in U.S. Appl. No. 10/710,326.
Non-Final Office Action issued May 1, 2007 in U.S. Appl. No. 10/710,326.
Notice of Allowance issued Oct. 4, 2007 in U.S. Appl. No. 10/710,326.
Supplemental Notice of Allowance issued Nov. 8, 2007 in U.S. Appl. No. 10/710,326.
Non-Final Office Action issued May 1, 2008 in U.S. Appl. No. 11/861,347.
Non-Final Office Action issued May 2, 2008 in U.S. Appl. No. 11/861,351.
Non-Final Office Action issued May 1, 2008 in U.S. Appl. No. 11/861,354.
Non-Final Office Action issued May 25, 2007 in U.S. Appl. No. 10/710,327.
Notice of Allowance issued Nov. 13, 2007 in U.S. Appl. No. 10/710,327.
Non-Final Office Action issued May 1, 2008 in U.S. Appl. No. 11/861,463.
Non-Final Office Action issued May 8, 2008 in U.S. Appl. No. 11/861,481.
Non-Final Office Action issued Sep. 21, 2006 in U.S. Appl. No. 10/710,328.
Notice of Abandonment issued Jun. 28, 2007 in U.S. Appl. No. 10/710,328.
Non-Final Office Action issued Sep. 19, 2006 in U.S. Appl. No. 10/710,329.
Notice of Abandonment issued Aug. 23, 2007 in U.S. Appl. No. 10/710,329.
Non-Final Office Action issued Mar. 9, 2006 in U.S. Appl. No. 10/710,330.
Notice of Abandonment issued Nov. 17, 2006 in U.S. Appl. No. 10/710,330.
Non-Final Office Action issued Jul. 29, 2005 in U.S. Appl. No. 10/710,331.
Final Office Action issued Nov. 29, 2005 in U.S. Appl. No. 10/710,331.
Advisory Action issued Feb. 9, 2006 in U.S. Appl. No. 10/710,331.
Non-Final Office Action issued May 3, 2006 in U.S. Appl. No. 10/710,331.
Notice of Abandonment issued Jan. 10, 2007 in U.S. Appl. No. 10/710,331.
Non-Final Office Action issued Jul. 19, 2005 in U.S. Appl. No. 10/710,332.
Final Office Action issued Nov. 21, 2005 in U.S. Appl. No. 10/710,332.
Advisory Action issued Feb. 10, 2006 in U.S. Appl. No. 10/710,332.
Non-Final Office Action issued May 3, 2006 in U.S. Appl. No. 10/710,332.
Final Office Action issued Oct. 10, 2006 in U.S. Appl. No. 10/710,332.
Advisory Action issued Jan. 5, 2007 in U.S. Appl. No. 10/710,332.
Non-Final Office Action issued Apr. 20, 2007 in U.S. Appl. No. 10/710,332.
Notice of Allowance issued Oct. 4, 2007 in U.S. Appl. No. 10/710,332.
Supplemental Notice of Allowance issued Nov. 8, 2007 in U.S. Appl. No. 10/710,332.
Non-Final Office Action issued May 2, 2008 in U.S. Appl. No. 11/861,600.
Notice of Allowance issued May 8, 2006 in U.S. Appl. No. 10/708,549.
Non-Final Office Action issued May 17, 2007 in U.S. Appl. No. 10/810,469.
Final Office Action issued Jan. 11, 2008 in U.S. Appl. No. 10/810,469.
Advisory Action issued Apr. 30, 2008 in U.S. Appl. No. 10/810,469.
Notice of Allowance issued Aug. 5, 2008 in U.S. Appl. No. 10/810,469.
Final Office Action issued Jul. 28, 2005 in U.S. Appl. No. 10/710,307.
Final Office Action issued Nov. 21, 2005 in U.S. Appl. No. 10/710,307.
Advisory Action issued Feb. 10, 2006 in U.S. Appl. No. 10/710,307.
Non-Final Office Action issued May 2, 2006 in U.S. Appl. No. 10/710,307.
Final Office Action issued Oct. 10, 2006 in U.S. Appl. No. 10/710,307.
Advisory Action issued Jan. 5, 2007 in U.S. Appl. No. 10/710,307.
Non-Final Office Action issued Apr. 10, 2007 in U.S. Appl. No. 10/710,307.
Notice of Allowance issued Oct. 4, 2007 in U.S. Appl. No. 10/710,307.
Supplemental Notice of Allowance issued Nov. 8, 2007 in U.S. Appl. No. 710,307.
Office Action dated Mar. 6, 2008 for AU2005270228.
Office Action dated Jun. 18, 2008 for AU2005270228.
Office Action dated Apr. 14, 2008 for CA2570739.
ISR/WO dated Oct. 10, 2006 for PCT/US2005/19388.
IPRP dated Mar. 15, 2007 for PCT/US05/19388.
Non-Final Office Action issued Feb. 26, 2008 in U.S. Appl. No. 11/859,153.
Notice of Allowance issued Jun. 20, 2008 in U.S. Appl. No. 11/859,153.
Examination Report dated Jun. 22, 2007 for GB 0700319.7.
Examination Report dated Nov. 22, 2007 for GB 0700319.7.
Search Report dated May 23, 2008 for GB 0700319.7.
Non-Final Office Action issued Feb. 26, 2008 in U.S. Appl. No. 11/859,171.
Notice of Allowance issued Jun. 19, 2008 in U.S. Appl. No. 11/859,171.
Examination Report dated Jun. 16, 2008 for SG200608843-9.
Non-Final Office Action issued Jul. 29, 2005 in U.S. Appl. No. 10/710,308.
Final Office Action issued Nov. 29, 2005 in U.S. Appl. No. 10/710,308.
Advisory Action issued Feb. 10, 2006 in U.S. Appl. No. 10/710,308.
Non-Final Office Action issued May 2, 2006 in U.S. Appl. No. 10/710,308.
Final Office Action issued Oct. 10, 2006 in U.S. Appl. No. 10/710,308.
Advisory Action issued Jan. 8, 2007 in U.S. Appl. No. 10/710,308.
Non-Final Office Action issued May 1, 2007 in U.S. Appl. No. 10/710,308.
Notice of Allowance issued Sep. 26, 2007 in U.S. Appl. No. 10/710,308.
Supplemental Notice of Allowance issued Dec. 11, 2007 in U.S. Appl. No. 10/710,308.
Non-Final Office Action issued Mar. 18, 2008 in U.S. Appl. No. 11/860,704.
Notice of Allowance issued Jul. 3, 2008 in U.S. Appl. No. 11/860,704.
Non-Final Office Action issued Apr. 3, 2008 in U.S. Appl. No. 11/860,726.
Notice of Allowance issued Jul. 14, 2008 in U.S. Appl. No. 11/860,726.
Non-Final Office Action issued Jul. 19, 2005 in U.S. Appl. No. 10/710,309.
Final Office Action issued Nov. 21, 2005 in U.S. Appl. No. 10/710,309.
Advisory Action issued Feb. 10, 2006 in U.S. Appl. No. 10/710,309.
Non-Final Office Action issued May 2, 2006 in U.S. Appl. No. 10/710,309.

Notice of Abandonment issued Dec. 19, 2006 in U.S. Appl. No. 10/710,309.
Non-Final Office Action issued May 6, 2005 in U.S. Appl. No. 10/710,310.
Final Office Action issued Oct. 19, 2005 in U.S. Appl. No. 10/710,310.
Advisory Action issued Dec. 29, 2005 in U.S. Appl. No. 10/710,310.
Non-Final Office Action issued Apr. 5, 2006 in U.S. Appl. No. 10/710,310.
Notice of Abandonment issued Oct. 20, 2006 in U.S. Appl. No. 10/710,310.
Non-Final Office Action issued Jan. 10, 2008 in U.S. Appl. No. 10/708,840.
Final Office Action issued Jul. 17, 2008 in U.S. Appl. No. 10/708,840.
Advisory Action issued Sep. 5, 2008 in U.S. Appl. No. 10/708,840.
Non-Final Office Action issued Feb. 8, 2008 in U.S. Appl. No. 11/851,580.
Non-Final Office Action issued Feb. 11, 2008 in U.S. Appl. No. 11/851,623.
Restriction Requirement issued Aug. 20, 2008 in U.S. Appl. No. 11/851,623.
Non-Final Office Action issued Feb. 15, 2008 in U.S. Appl. No. 11/858,393.
Non-Final Office Action issued Jan. 30, 2006 in U.S. Appl. No. 10/708,841.
Final Office Action issued May 25, 2006 in U.S. Appl. No. 10/708,841.
Notice of Allowance issued Oct. 6, 2006 in U.S. Appl. No. 10/708,841.
Non-Final Office Action issued Mar. 11, 2008 in U.S. Appl. No. 11/164,352.
Final Office Action issued Aug. 18, 2008 in U.S. Appl. No. 11/164,352.
ISR/WO dated Jul. 11, 2008 for PCT/US06/07570.
Non-Final Office Action issued Aug. 11, 2004 in U.S. Appl. No. 10/611,563.
Final Office Action issued Mar. 24, 2005 in U.S. Appl. No. 10/611,563.
Advisory Action issued May 18, 2005 in U.S. Appl. No. 10/611,563.
Non-Final Office Action issued Jul. 27, 2005 in U.S. Appl. No. 10/611,563.
Non-Final Office Action issued Nov. 16, 2005 in U.S. Appl. No. 10/611,563.
Final Office Action issued May 31, 2006 in U.S. Appl. No. 10/611,563.
Advisory Action issued Oct. 6, 2006 in U.S. Appl. No. 10/611,563.
Non-Final Office Action issued Jan. 8, 2007 in U.S. Appl. No. 10/611,563.
Non-Final Office Action issued Jun. 18, 2007 in U.S. Appl. No. 10/611,563.
Notice of Allowance issued Sep. 24, 2007 in U.S. Appl. No. 10/611,563.
ISR dated Mar. 26, 2004 for PCT/US03/34602.
WO dated Oct. 13, 2004 for PCT/US03/34602.
IPER dated Jan. 20, 2005 for PCT/US03/34602.
Office Action dated Feb. 16, 2005 for TW092131042.
Office Action dated May 18, 2006 for AR 041912 A1.
Office Action dated Mar. 8, 2007 for AR 041912 A1.
Non-Final Office Action issued Apr. 1, 2008 in U.S. Appl. No. 10/810,473.
Non-Final Office Action issued Oct. 17, 2007 in U.S. Appl. No. 10/710,611.
Final Office Action issued May 28, 2008 in U.S. Appl. No. 10/710,611.
Advisory Action issued Sep. 5, 2008 in U.S. Appl. No. 10/710,611.
Non-Final Office Action issued Mar. 4, 2008 in U.S. Appl. No. 10/711,720.
Final Office Action issued Jul. 23, 2008 in U.S. Appl. No. 10/711,720.
Non-Final Office Action issued Jul. 7, 2005 in U.S. Appl. No. 10/708,548.
Notice of Allowance issued Jan. 31, 2006 in U.S. Appl. No. 10/708,548.
Non-Final Office Action issued Feb. 25, 2008 in U.S. Appl. No. 10/708,569.
Non-Final Office Action issued Sep. 24, 2007 in U.S. Appl. No. 10/708,547.
Final Office Action issued Feb. 14, 2008 in U.S. Appl. No. 10/708,547.
Advisory Action issued Jul. 29, 2008 in U.S. Appl. No. 10/708,547.
Non-Final Office Action issued Mar. 22, 2006 in U.S. Appl. No. 10/708,597.
Final Office Action issued Oct. 10, 2006 in U.S. Appl. No. 10/708,597.
Restriction Requirement issued Mar. 22, 2007 in U.S. Appl. No. 10/708,597.
Non-Final Office Action issued Aug. 8, 2007 in U.S. Appl. No. 10/708,597.
Final Office Action issued Mar. 17, 2008 in U.S. Appl. No. 10/708,597.
Advisory Action issued Jul. 11, 2008 in U.S. Appl. No. 10/708,597.
Non-Final Office Action issued Nov. 1, 2007 in U.S. Appl. No. 10/746,781.
Final Office Action issued Jul. 10, 2008 in U.S. Appl. No. 10/746,781.
Ex-Parte Quayle Action issued Dec. 14, 2005 in U.S. Appl. No. 10/708,549.
Final Office Action issued Mar. 28, 2008 in U.S. Appl. No. 10/711,965.
Advisory Action issued Jul. 31, 2008 in U.S. Appl. No. 10/711,965.
Final Office Action issued Aug. 18, 2008 in U.S. Appl. No. 10/711,965.
Non-Final Office Action issued May 4, 2006 in U.S. Appl. No. 10/711,970.
Notice of Allowance issued Feb. 2, 2007 in U.S. Appl. No. 10/711,970.
ISR/WO dated Aug. 17, 2006 for PCT/US05/36828.
IPRP (Ch 1) dated Apr. 26, 2007 for PCT/US05/36828.
Non-Final Office Action issued Feb. 25, 2008 in U.S. Appl. No. 10/711,964.
Final Office Action issued Jun. 30, 2008 in U.S. Appl. No. 10/711,964.
Advisory Action issued Sep. 10, 2008 in U.S. Appl. No. 10/711,964.
Non-Final Office Action issued Oct. 3, 2006 in U.S. Appl. No. 10/711,966.
Final Office Action issued May 21, 2007 in U.S. Appl. No. 10/711,966.
Non-Final Office Action issued Dec. 11, 2007 in U.S. Appl. No. 10/711,966.
Non-Final Office Action issued Nov. 28, 2005 in U.S. Appl. No. 10/708,824.
Final Office Action issued May 17, 2006 in U.S. Appl. No. 10/708,824.
Notice of Abandonment issued Jan. 5, 2007 in U.S. Appl. No. 10/708,824.
Non-Final Office Action issued Dec. 13, 2005 in U.S. Appl. No. 10/708,825.
Final Office Action issued May 11, 2006 in U.S. Appl. No. 10/708,825.
Notice of Abandonment issued Jan. 25, 2007 in U.S. Appl. No. 10/708,825.
Non-Final Office Action issued Nov. 29, 2005 in U.S. Appl. No. 10/708,826.
Final Office Action issued May 17, 2006 in U.S. Appl. No. 10/708,826.
Notice of Abandonment issued Jan. 5, 2007 in U.S. Appl. No. 10/708,826.
Non-Final Office Action issued Jan. 10, 2006 in U.S. Appl. No. 10/708,827.
Final Office Action issued May 9, 2006 in U.S. Appl. No. 10/708,827.
Notice of Abandonment issued Jan. 5, 2007 in U.S. Appl. No. 10/708,827.
Non-Final Office Action issued Jan. 27, 2006 in U.S. Appl. No. 10/708,828.

Final Office Action issued Jul. 21, 2006 in U.S. Appl. No. 10/708,828.
Notice of Abandonment issued Mar. 22, 2007 in U.S. Appl. No. 10/708,828.
Non-Final Office Action issued Dec. 15, 2005 in U.S. Appl. No. 10/708,829.
Final Office Action issued May 25, 2006 in U.S. Appl. No. 10/708,829.
Notice of Abandonment issued Jan. 5, 2007 in U.S. Appl. No. 10/708,829.
Non-Final Office Action issued Nov. 27, 2006 in U.S. Appl. No. 10/708,832.
Notice of Abandonment issued Aug. 16, 2007 in U.S. Appl. No. 10/708,832.
Non-Final Office Action issued Jan. 20, 2006 in U.S. Appl. No. 10/708,834.
Final Office Action issued May 25, 2006 in U.S. Appl. No. 10/708,834.
Notice of Abandonment issued Jan. 5, 2007 in U.S. Appl. No. 10/708,834.
Non-Final Office Action issued Dec. 16, 2005 in U.S. Appl. No. 10/708,835.
Final Office Action issued May 17, 2006 in U.S. Appl. No. 10/708,835.
Notice of Abandonment issued Jan. 5, 2007 in U.S. Appl. No. 10/708,835.
Non-Final Office Action issued Dec. 16, 2005 in U.S. Appl. No. 10/708,836.
Final Office Action issued May 25, 2006 in U.S. Appl. No. 10/708,836.
Notice of Abandonment issued Jan. 5, 2007 in U.S. Appl. No. 10/708,836.
Non-Final Office Action issued Aug. 8, 2005 in U.S. Appl. No. 10/708,838.
Final Office Action issued Nov. 29, 2005 in U.S. Appl. No. 10/708,838.
Advisory Action issued Feb. 9, 2006 in U.S. Appl. No. 10/708,838.
Non-Final Office Action issued Apr. 18, 2006 in U.S. Appl. No. 10/708,838.
Notice of Abandonment issued Nov. 1, 2006 in U.S. Appl. No. 10/708,838.
ISR/WO issued Jan. 29, 2008 in PCT/US06/22542.
Non-Final Office Action issued Nov. 1, 2007 in U.S. Appl. No. 10/711,613.
Restriction Requirement issued Aug. 7, 2008 in U.S. Appl. No. 10/711,613.
Muller, "Desktop Encyclopedia of the Internet," 1999, Artech House Inc., Norwood, MA, all pages.
"The Bank Credit Card Business," American Bankers Association, 1996, all pages.
Menezes, et al., "Handbook of Applied Cryptography," 1997, CRC Press, Chapter 10.
U.S. Appl. No. 60/395,606, filed Jul. 15, 2002.
"Credit Card Offer Travelers New Benefit," PR Newswire, Aug. 5, 1987.
"Inside's Next Gen Smart Card: The French company plans to introduce an RFID card that uses a 16-bit microprocessor and new encryption technology," RFID Journal, Oct. 29, 2002.
"New Evidence about Positive Three-Tier Co-Pay Performance Presented at Express Scripts 2000 Outcomes Conference," PR Newswire Association, Inc., Jun. 28, 2000.
"Prestige Credit Cards: Those Pricey Plastics," Changing Times, Apr. 1986.
"Shell Introduces Optional Credit Card," The Associated Press, Sep. 3, 1985.
"Shell Introducing Expanded 'Signature' Credit Card," Tulsa Business Chronicle, Sep. 5, 1985.
"Shell-Oil: Introduces Shell Signature Travel and Entertainment Credit Card," Business Wire, Sep. 3, 1985.
"The Chase Manhattan Bank Today Announced a Comprehensive Program to Enhance the Value of All of its Credit Cards," PR Newswire, Dec. 18, 1986.
Carey, Gordon, "Multi-tier Copay," Pharmaceutical Executive, Feb. 2000.
Crumbaugh, Darlene M., "Effective Marketing Positions: Check card as consumer lifeline," Hoosier Banker, Apr. 1998, p. 10, vol. 82, issue 4.
Gabber, et al., "Agora: A Minimal Distributed Protocol for Electronic Commerce," USENIX Oakland, CA, Nov. 18, 1996.
Goldwasser, Joan, "Best of the Cash-Back Cards," Kiplinger's Personal Finance Magazine, Apr. 1999.
Kuntz, Mary, "Credit Cards as Good as Gold," Forbes, Nov. 4, 1985.
Lahey, Liam, "Microsoft Bolsters Rebate Structure," Computer Dealer News, Feb. 8, 2002.
Lamond, "Credit Card Transactions Real World and Online," Copyright 1996.
Nyman, Judy, "Free Income Tax Clinics are Opening as Apr. 30 Deadline Draws Nearer," The Toronto Star, Final Edition, Mar. 25, 1986.
Obel, Michael, "Oil Companies Push Marketing, Cost Cutting to Fortify Earnings," Oil & Gas Journal, Sep. 16, 1985.
Schmuckler, Eric, "Playing Your Cards Right," Forbes, Dec. 28, 1987.
"Core One Credit Union—Discover The Advantage," http://coreone.org/2visa.html, Copyright 2001 (last visited Oct. 9, 2002).
Non-Final Office Action issued Apr. 20, 2005 in U.S. Appl. No. 10/192,488.
Final Office Action issued Sep. 8, 2005 in U.S. Appl. No. 10/192,488.
Advisory Action issued Nov. 10, 2005 in U.S. Appl. No. 10/192,488.
Non-Final Office Action issued Jan. 18, 2006 in U.S. Appl. No. 10/192,488.
Final Office Action issued Sep. 25, 2006 in U.S. Appl. No. 10/192,488.
Notice of Allowance issued Feb. 2, 2007 in U.S. Appl. No. 10/192,488.
Examiner's Report dated Oct. 5, 2006 for AU2002318293.
Office Action dated Jun. 28, 2007 in CA 2,452,351.
Office Action dated Apr. 25, 2008 in CA 2,452,351.
Supplemental Search Report dated Nov. 16, 2004 for EP02748120.9.
Examination Report dated Mar. 8, 2005 for EP02748120.9.
Examination Report dated Feb. 8, 2006 for EP02748120.9.
Examination Report dated Oct. 24, 2007 for EP02748120.9.
Office Action dated Mar. 9, 2006 in JP2003-513257.
Office Action dated Oct. 20, 2006 in JP2003-513257.
Office Action dated Aug. 1, 2007 in JP2003-513257.
Office Action dated Jan. 29, 2008 in JP2003-513257.
Office Action dated Jul. 11, 2007 for MX PA/a/2004/000253.
Office Action dated Jan. 27, 2005 in NZ530497.
ISR dated Dec. 30, 2002 for PCT/US02/0219903.
Office Action dated Dec. 30, 2005 for CN02813783.3.
Office Action dated May 16, 2007 for CN02813783.3.
Non-Final Office Action mailed Feb. 8, 2008 in U.S. Appl. No. 10/340,352.
Final Office Action mailed Jun. 13, 2008 in U.S. Appl. No. 10/340,352.
Advisory Action mailed Aug. 19, 2008 in U.S. Appl. No. 10/340,352.
Office Action dated Jan. 29, 2007 for CA2458143.
Office Action dated Dec. 19, 2007 for CA2458143.
Non-Final Office Action issued May 1, 2008 in U.S. Appl. No. 11/861,626.
Non-Final Office Action issued Jan. 27, 2005 in U.S. Appl. No. 10/710,334.
Final Office Action issued Sep. 30, 2005 in U.S. Appl. No. 10/710,334.
Advisory Action issued Dec. 19, 2005 in U.S. Appl. No. 10/710,334.
Non-Final Office Action issued Apr. 10, 2006 in U.S. Appl. No. 10/710,334.
Notice of Abandonment issued Nov. 6, 2006 in U.S. Appl. No. 10/710,334.
Non-Final Office Action issued Aug. 8, 2005 in U.S. Appl. No. 10/710,335.
Final Office Action issued Dec. 15, 2005 in U.S. Appl. No. 10/710,335.
Advisory Action issued Mar. 8, 2006 in U.S. Appl. No. 10/710,335.

Non-Final Office Action issued May 9, 2006 in U.S. Appl. No. 10/710,335.
Final Office Action issued Oct. 19, 2006 in U.S. Appl. No. 10/710,335.
Advisory Action issued Jan. 12, 2007 in U.S. Appl. No. 10/710,335.
Non-Final Office Action issued Apr. 19, 2007 in U.S. Appl. No. 10/710,335.
Notice of Allowance issued Sep. 19, 2007 in U.S. Appl. No. 10/710,335.
Supplemental Notice of Allowance issued Oct. 25, 2007 in U.S. Appl. No. 10/710,335.
Non-Final Office Action issued May 1, 2008 in U.S. Appl. No. 11/862,268.
Non-Final Office Action issued Aug. 4, 2008 in U.S. Appl. No. 11/306,617.
ISR/WO dated Jul. 9, 2008 for PCT/US06/45362.
Non-Final Office Action issued Jun. 24, 2008 in U.S. Appl. No. 11/161,295.
Non-Final Office Action issued Sep. 8, 2005 in U.S. Appl. No. 10/906,732.
Final Office Action issued Mar. 8, 2006 in U.S. Appl. No. 10/906,732.
Advisory Action issued Jul. 5, 2006 in U.S. Appl. No. 10/906,732.
Notice of Allowance issued Aug. 11, 2006 in U.S. Appl. No. 10/906,732.
Non-Final Office Action issued Oct. 15, 2007 in U.S. Appl. No. 11/161,105.
Final Office Action issued Apr. 21, 2008 in U.S. Appl. No. 11/161,105.
Notice of Allowance issued Jul. 3, 2008 in U.S. Appl. No. 11/161,105.
Non-Final Office Action issued Apr. 11, 2008 in U.S. Appl. No. 11/552,886.
Final Office Action issued Aug. 6, 2008 in U.S. Appl. No. 11/552,886.
Advisory Action issued Sep. 18, 2008 in U.S. Appl. No. 11/552,886.
Smith, M.T., "Smart Cards: Integrating for Portable Complexity," Computer-Integrated Engineering, Aug. 1998, pp. 110-115.
Geer, et al., "Token-Mediated Certification and Electronic Commerce," Proc. 2nd USENIX Workshop on Electronic Commerce, Nov. 18-21, 1996, pp. 13-22.
Gobioff, et al., "Smart Cards in Hostile Environments," Proc. 2nd USENIX Workshop in Electronic Commerce, Nov. 18-21, 1996, pp. 23-28.
Fancher, C.H., "In Your Pocket Smartcards," IEEE Spectrum, Feb. 1997, pp. 47-53.
Blythe, I., "Smarter, More Secure Smartcards," Byte, Jun. 1997, pp. 63-64.
Leach, Dr. J., "Dynamic Authentication for Smartcards," Computers and Security, vol. 14, No. 5, 1995, pp. 385-389.
Wu, et al., "Authenticating Passwords Over an Insecure Channel," Computers and Security, vol. 15, No. 5, 1996, pp. 431-439.
Manninger, et al., "Adapting an Electronic Purse for Internet Payments," ACISP '98 Proceedings, Jul. 13-15, 1998, pp. 205-214.
Yan, et al., "Banking on the Internet and Its Applications," Proc. 13th Annual Hawaii International Conference on System Sciences, vol. 4, 1997, pp. 275-284.
Transport Layer Security Working Group, "The SSL Protocol, Version 3.0," Nov. 18, 1996 (also available at http://home.netscape.com/eng/ssl3/draft302.txt).
Business Wire (press release), "Master Card E-Wallet," Jul. 11, 2000.
Obongo.com Website, "Obongo," Aug. 8, 2000 (Description of wallet toolbar also available at http://www.obongo.com/chabi/website/index.htm).
PR Newswire (press release), "Providian Launches Nation's First Clear Chip Card," Sep. 12, 2000. The press release may be related to the art of the invention, but based upon the information in the press release, it is unclear if the press release is prior art. However, in an abundance of caution the Applicant desires to put the press release into the file wrapper.
"'Magic Wands' to Speed Mobile Sales", Bob Brewin, Jan. 15, 2001, http://www.computerworld.com/mobiletopics/mobile/story/1,10801,563300.html.
"Mobile Speedpass Goes Global as Mobil Singapore Rolls Out Asia's First RFID-Based Pay-At-The-Pump System", Press Release, Apr. 5, 1999, http://www.ti.com/tiris/docs/news_releases/rel12.htm (3 pages).
"Speedpass Unleashed", Jun. 4, 2002 http://www.cardweb.com/cardtrak/news/cf2_20a_97.html (2 pages).
International Newsletter of the TI RFID Group, Issue 20, 2000 (12 pages).
"CES: Microsoft's SPOT Technology has Humble Origins", by James Niccolai, Jan. 10, 2003, http://archive.inforworld.com/articles/hn/xml/03/01/10/030110hnspot.xml?s=IDGNS (3 pages).
"Microsoft: See SPOT Run on Your Wrist", by Richard Shim, Jun. 5, 2003, http://news.com.com/2100-1041_3-1013442.html?tag=fd_top (1 page).
"Networking: Microsoft SPOT", by Jeremy A. Kaplan, Jul. 1, 2003, http://www.pcmag.com/print_article/0,3048,a=43561,00.asp (2 pages).
"Microsoft Launches Smart Personal Object Technology Initiative", Press Release from COMDEX Fall 2002, Nov. 17, 2002, http://www.Microsoft.com/presspass/features/2002/nov02/11-17SPOT.asp (4 pages).
"Bank Extends RFID Payment Pilot: Bank of America will continue to test its QuickWave RFID payment card for another three months", RFID Journal, Jan. 23, 2003.
"MasterCard to Test RFID Card: Pilot will test whether consumers, merchants and credit card issuers value "contactless" payments", RFID Journal, Dec. 20, 2002.
"Vendors Target Amusement Parks: Protecting children and enabling cashless payments make RFID an appealing option for the entertainment industry", RFID Journal, Nov. 27, 2002.
"Inside's Next-Gen Smart Card: The French company plans to introduce an RFID card that uses a 16-bit microprocessor and new encryption technology", RFID Journal, Oct. 29, 2002.
"Sony, Philips Creating RFID Link: Consumer electronics giants are jointly developing a new RFID standard for payments and for communication between devices", RFID Journal, Sep. 17, 2002.
"Japan Gets Digital Ticket System: A national ticket seller and phone company are teaming up to create an electronic ticket", RFID Journal, Aug. 31, 2002.
"Security for Wireless Java: NTRU, a startup that offers security software, has relased of Java version of its NTRU encryption algorithm", RFID Journal, Jun. 27, 2002.
"Making RFID Payments Ubiquitous: Philips and Visa want people to be able to pay for goods and services anywhere by using RFID chips embedded in the phones and other devices", RFID Journal, Jun. 2, 2003.
"TI Embraces Prox Card Standard: Texas Instruments ISO 14443 payment platform promises faster data transfer rates and more security", RFID Journal, Mar. 6, 2003.
"Multiple Frequency Transponders: Volume production of dual-band RFID chips begins", Frontline Solutions, Jul. 16, 2003.
http://www.semiconductors.phillips.com/news/content/file_878.html, Apr. 7, 2003.
http://www.palowireless.com/infotooth/whatis.asp, Apr. 28, 2003.
http://www.palowireless.com/infotooth/tutorial.asp, Apr. 28, 2003.
http://www.palowireless.com/infotooth/tutorial/profiles.asp, Apr. 28, 2003.
http://www.palowireless.com/infotooth/tutorial/radio.asp, Apr. 28, 2003.
http://www.polowireless.com/infotooth/tutorial/baseband.asp, Apr. 28, 2003.
http://www.palowireless.com/infotooth/tutorial/Imp.asp, Apr. 28, 2003.
http://www.palowireless.com/infotooth/tutorial/hci.asp, Apr. 28, 2003.
http://www.palowireless.com/infotooth/tutoria1/12cap.asp, Apr. 28, 2003.
http://www.palowireless.com/infotooth/tutorial/rfcomm.asp, Apr. 28, 2003.
http://www.palowireless.com/infotooth/tutorial/sdp.asp, Apr. 28, 2003.
http://www.palowireless.com/infotooth/tutorialk1_gap.asp, Apr. 28, 2003.

"Sony, Phillips to Test RFID Platform", RFID Journal, May 8, 2003.
"RFID Take Priority With Wal-Mart", by DocMemory, http://www.simmtester.com/page/news/shownews.asp?num=6550, Feb. 9, 2004, 2 pages.
"Microsoft, IBM and Phillips Test RFID Technology", by Rohde, IDG New Service, http:www.computerweekly.com/Article127889.htm, Feb. 9, 2004, 3 pages.
"PowerPay RFID Payment and Marketing Solution Speeds Purchases at Seahawks Stadium with Technology from Texas Instruments", http://www.powerpayit.com/news/Seahawks_pr.html, Feb. 9, 2004, 2 pages.
Derfler, "How Networks Work," Bestseller Edition 1996, Ziff-Davis Press, Emeryville, CA, all pages.
White, "How Computers Work," Millennium Edition, 1999, Que Corporation, Indianapolis, IN, all pages.
Gralia, "How the Internet Works," Millennium Edition, 1999, Que Corporation, Indianapolis, IN, all pages.
Non-Final Office Action issued Dec. 9, 2003 in U.S. Appl. No. 10/242,584.
Notice of Allowance issued Jul. 9, 2004 in U.S. Appl. No. 10/242,584.
Office Action dated May 23, 2008 for JP2004-543166.
ISR dated Mar. 7, 2003 for PCT/US02/32653.
WO dated Aug. 27, 2004 for PCT/US02/32653.
IPER dated Jan. 10, 2005 for PCT/US02/32653.
Ex-Parte Quayle Action issued Jun. 6, 2005 in U.S. Appl. No. 10/710,484.
Notice of Allowance issued Aug. 2, 2005 in U.S. Appl. No. 10/710,484.
Non-Final Office Action issued May 17, 2005 in U.S. Appl. No. 10/711,773.
Final Office Action issued Nov. 1, 2005 in U.S. Appl. No. 10/711,773.
Advisory Action issued Feb. 15, 2006 in U.S. Appl. No. 10/711,773.
Notice of Allowance issued May 17, 2006 in U.S. Appl. No. 10/711,773.
ISR/WO dated Jun. 20, 2005 for PCT/US05/07195.
IPRP (Ch 1) dated Apr. 19, 2007 for PCT/US05/07195.
Non-Final Office Action issued Feb. 28, 2006 in U.S. Appl. No. 10/709,815.
Notice of Allowance issued Sep. 26, 2006 in U.S. Appl. No. 10/709,815.
Non-Final Office Action issued Jul. 10, 2008 in U.S. Appl. No. 11/163,595.
Non-Final Office Action issued Jul. 12, 2005 in U.S. Appl. No. 10/708,822.
Final Office Action issued Nov. 2, 2005 in U.S. Appl. No. 10/708,822.
Advisory Action issued Dec. 20, 2005 in U.S. Appl. No. 10/708,822.
Non-Final Office Action issued Apr. 7, 2006 in U.S. Appl. No. 10/708,822.
Final Office Action issued Oct. 19, 2006 in U.S. Appl. No. 10/708,822.
Advisory Action issued Jan. 10, 2007 in U.S. Appl. No. 10/708,822.
Non-Final Office Action issued Apr. 23, 2007 in U.S. Appl. No. 10/708,822.
Notice of Allowance issued Sep. 19, 2007 in U.S. Appl. No. 10/708,822.
ISR/WO dated Nov. 16, 2005 for PCT/US05/09452.
IPRP dated Aug. 16, 2006 for PCT/US05/09452.
IPRP dated Jan. 5, 2007 for PCT/US05/09452.
Non-Final Office Action issued Jan. 22, 2008 in U.S. Appl. No. 11/858,958.
Non-Final Office Action issued Jun. 6, 2005 in U.S. Appl. No. 10/708,830.
Non-Final Office Action issued Oct. 4, 2005 in U.S. Appl. No. 10/708,830.
Notice of Allowance issued Mar. 2, 2006 in U.S. Appl. No. 10/708,830.
Supplemental Notice of Allowance issued Aug. 4, 2006 in U.S. Appl. No. 10/708,830.
Non-Final Office Action issued May 15, 2007 in U.S. Appl. No. 10/708,831.
Notice of Allowance issued Oct. 31, 2007 in U.S. Appl. No. 10/708,831.
Notice of Abandonment issued Mar. 6, 2008 in U.S. Appl. No. 10/708,831.
Non-Final Office Action issued Jun. 6, 2005 in U.S. Appl. No. 10/708,833.
Notice of Allowance issued Dec. 9, 2005 in U.S. Appl. No. 10/708,833.
Supplemental Notice of Allowance issued Feb. 23, 2006 in U.S. Appl. No. 10/708,833.
Non-Final Office Action issued Mar. 22, 2006 in U.S. Appl. No. 10/708,837.
Final Office Action issued Oct. 10, 2006 in U.S. Appl. No. 10/708,837.
Advisory Action issued Jan. 12, 2007 in U.S. Appl. No. 10/708,837.
Non-Final Office Action issued Apr. 23, 2007 in U.S. Appl. No. 10/708,837.
Notice of Allowance issued Oct. 12, 2007 in U.S. Appl. No. 10/708,837.
Supplemental Notice of Allowance issued Dec. 20, 2007 in U.S. Appl. No. 10/708,837.
Non-Final Office Action issued Dec. 11, 2007 in U.S. Appl. No. 11/851,533.
Final Office Action issued Jul. 25, 2008 in U.S. Appl. No. 11/851,533.
Advisory Action issued Aug. 29, 2008 in U.S. Appl. No. 11/851,533.
Non-Final Office Action issued Jan. 4, 2008 in U.S. Appl. No. 11/851,556.
Final Office Action issued Jul. 31, 2008 in U.S. Appl. No. 11/851,556.
Office Action issued Jan. 26, 2009 for Japanese Patent Application No. 2004-543166.

* cited by examiner

SYSTEM AND METHOD FOR REASSOCIATING AN ACCOUNT NUMBER TO ANOTHER TRANSACTION ACCOUNT

Matter enclosed in heavy brackets [ ] appears in the original patent but forms no part of this reissue specification; matter printed in italics indicates the additions made by reissue.

CROSS REFERENCE TO RELATED APPLICATIONS

This application *is a Reissue of U.S. application Ser. No. 10/710,484 (filed Jul. 14, 2004), now U.S. Pat. No. 6,991,157 (issued Jan. 31, 2006); the '484 application itself* is a continuation of, and claims priority to, U.S. Ser. No. 10/242,584, filed on Sep. 12, 2002 now U.S. Pat. No. 6,805,287 *issued Oct. 19, 2004,* and entitled "SYSTEM AND METHOD FOR CONVERTING A STORED VALUE CARD TO A CREDIT CARD," which is hereby incorporated by reference.

FIELD OF INVENTION

The present invention relates, generally, to a system and method for transferring the association of a transaction card number from a first type of account to a second type of account. In particular, this invention allows a customer to transmit an existing card number, such as that embossed on a stored value card, to a host system, and request that the account number be re-associated and/or redefined from a first transaction account (e.g., stored value account) to a second transaction account (e.g., credit card account).

BACKGROUND OF INVENTION

Stored value cards and credit cards are forms of transaction instruments which provide cash equivalent value that can be used within an existing payment/transaction infrastructure. A difference between the accounts associated with the two types of cards is when the monetary value becomes available for use. Stored value cards are frequently referred to as prepaid or cash cards, in that money is deposited in the account associated with the card before use of the card is allowed. If a customer deposits ten dollars of value into the account associated with the card, the card can be used for payments up to ten dollars. In contrast, credit cards are backed not by cash, but by a line-of-credit that has been issued to the customer by a financial institution. As such, upon use of the credit (or charge) cards, the cash payment from the customer is completed after the purchase from the merchant, namely, when the customer is billed for using the line-of-credit associated with the card.

Another difference between the stored value card and the credit/charge card is the revenue generated from the use of the cards. With stored value cards, the monetary value is prepaid and the customer is assessed a fee whenever funds are loaded onto the card, wherein the fee is usually either a flat fee or a small percentage of the amount loaded. In contrast, credit cards represent a line-of-credit issued to the owner, so a finance charge and/or interest is typically assessed on any charged amount that is not paid off at the end of each month (e.g., unpaid balance). The finance charge assessed is usually anywhere from 10-25% of this balance. Therefore, credit cards are often more profitable than stored value cards. However, stored value cards are more easily acquired, so there are more stored value cards issued, funded, and used each day.

Moreover, fewer distribution restrictions are placed upon stored value cards. For example, a stored value card with a five dollar monetary value may be distributed to customers by a number of different methods (e.g., shipping with product, promotional distribution, etc). In contrast, credit or charge cards generally may only be shipped to the customer at the customer's request. Thus, one of the problems faced within the transaction card industry is how to most effectively distribute credit or charge cards to potential customers while still abiding by the distribution restrictions.

Another problem with credit or charge cards is that it can take several days or even weeks between the time a credit card application is completed and approved to when the customer receives the transaction card. In contrast, customers can purchase stored value cards at many outlets without waiting. Thus, a system or method is needed that enables a credit card applicant to more expeditiously obtain a transaction instrument corresponding to the customer's credit card account.

SUMMARY OF INVENTION

The present invention generally relates to a system and method for converting a first transaction account device (e.g., a card associated with a stored value account) to a second transaction account device (e.g., a card associated with a credit card account) by either re-associating or re-defining a card number from a first transaction account (e.g., stored value account) to a second transaction account (e.g., credit account).

An exemplary method of this invention comprises the steps of: establishing a second transaction account, receiving a card number associated with a first transaction account, and then, re-associating said card number to said second transaction account. Another exemplary method of this invention comprises the steps of: establishing a second transaction account, receiving a card number corresponding to a first transaction account, and redefining the first transaction account as said second transaction account, wherein said first transaction account is then closed.

BRIEF DESCRIPTION OF DRAWINGS

The above and other features and advantages of the present invention are hereinafter described in the following detailed description of illustrative embodiments to be read in conjunction with the accompanying drawings and figures, wherein like reference numerals are used to identify the same or similar system parts and/or method steps in the similar views, and.

Figure 1:
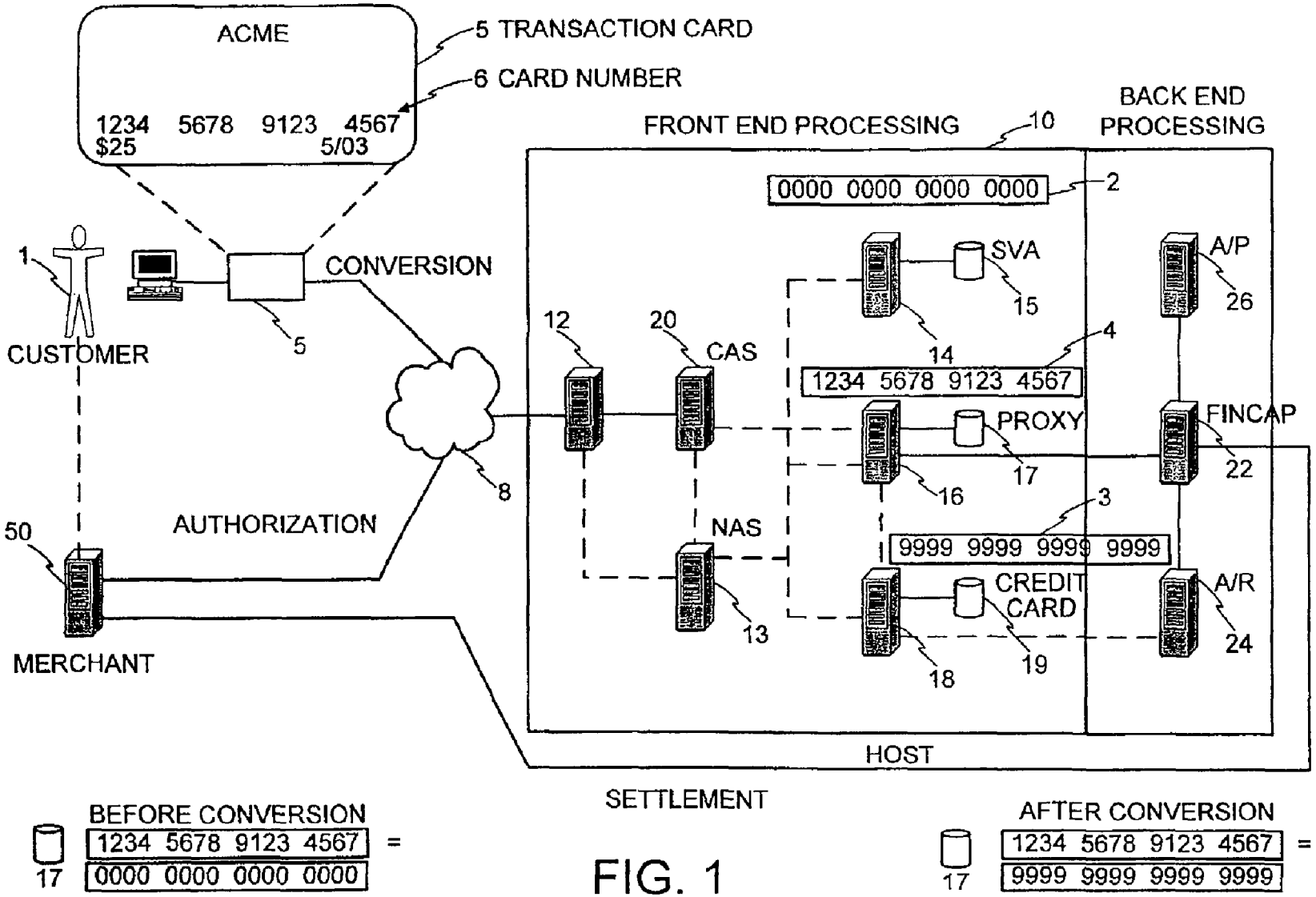
FIG. 1 illustrates an overview of system components comprising an exemplary embodiment of the present invention.

Other aspects and features of the present invention will be more fully apparent from the detailed description that follows.

DETAILED DESCRIPTION

The following descriptions are of exemplary embodiments of the invention, and are not intended to limit the scope, applicability or configuration of the invention in any way.

Rather, the following descriptions are intended to provide convenient illustrations for implementing various embodiments of the invention. As will become apparent, various changes may be made in the function and arrangement of the elements described in these embodiments without departing from the spirit and scope of the invention.

The present invention overcomes the problems of the prior art by allowing a single card number originally used as a first transaction account device (e.g., stored value card) to be changed to a second transaction account device (e.g., credit card). In an exemplary embodiment, the number on the card ("card number"), which is associated with a first transaction account in a host system, is re-associated to a second transaction account in a host system. In another embodiment, the card number, originally corresponding to, or defined as, a first transaction account is redefined within a host database system as a second transaction account. The card number may be, for example, the same as a stored value account or a credit card account. Or, the card number may be the same as a proxy account number, wherein the proxy account is used as a proxy for one or more accounts. Co-pending U.S. patent application Ser. No. 09/800,461, "System For Facilitating a Transaction", by Breck, et al., and filed on Mar. 7, 2001, describes various transaction processing systems, including the use of secondary transaction numbers (i.e., proxy accounts), the entire contents of which is hereby incorporated by reference.

In an exemplary embodiment, the system of the present invention allows customers to obtain a credit card device in a substantially real time environment by associating an existing card number to a new or existing credit card account. In particular, the card number embossed on the customer's first transaction account device (e.g., stored value card), may be re-associated within the host system from a first transaction account (e.g., stored value account) to a second transaction account (e.g., a credit or charge card account), wherein the second transaction account is associated with a line of credit established by the customer.

As used herein, a "transaction" includes any exchange or delivery of value, exchange or delivery of data, gifting of value or data, etc. The term "transaction" not only contemplates an exchange of goods or services for value from one party to another, but also the gifting of anything from one party to another. Additionally, transaction account numbers include account numbers that are used to facilitate any type of transaction. As used herein, "card number" includes any device, code, number, letter, symbol, biometric or other identifier/indicia suitably configured to allow the customer to interact or communicate with the system, such as, for example, authorization/access code, personal identification number (PIN), Internet code, other identification code, and/or the like which is optionally located on a rewards card, charge card, credit card, debit card, prepaid card, telephone card, smart card, magnetic stripe card, bar code card, transponder, radio frequency card and/or the like. Although the term "card number" is used throughout, the number need not physically exist on a "card" per se. In other words the card number may be a number communicated to the customer, merchant or host by any means. The card number may be distributed and stored in any form of plastic, electronic, magnetic, radio frequency, wireless, audio and/or optical device capable of transmitting or downloading data from itself to a second device.

As shown in FIG. 1, an exemplary embodiment of the present invention includes a host system 10 comprising various systems or sub-systems for processing financial account data. These systems are generally known in the art as systems for processing merchant 50 authorization requests and for facilitating transaction settlements.

The host system 10 includes any hardware and/or software suitably configured for processing merchant authorization requests and for facilitating transaction settlements. In an exemplary embodiment of this invention shown in FIG. 1, host system 10 comprises one or more interface systems 12 configured to facilitate communication with one or more customers 1 and/or one or more merchants 50. The interface system 12 is generally configured to route and communicate customer 1 and/or merchant 50 data to a card authorization system (CAS) 20 and/or a new accounts system (NAS) 13. The host system 10 also comprises server systems and databases for transaction accounts. These server systems may include: a first transaction account system, e.g., stored value account server 14 and database 15; a second transaction account system, e.g., credit card account server 18 and database 19; and, if desired, a proxy account system, including, e.g., STN server 16 and database 17. The previously mentioned components may be referred to as "front end processing components" which facilitate transaction authorizations to complete transactions. As those skilled in the art will appreciate, any hardware, software and/or systems discussed herein may be included within one host or distributed among many locations or entities.

Backend components of the host system 10 include any hardware and/or software generally configured to facilitate transaction settlement, i.e., payment of merchant 50 and invoicing of customer 1. These components generally include, for example, a financial capture system (FINCAP) 22 for capturing the merchant's 50 receipt and summary of charges, an accounts receivable system 24 for adjusting the account and billing customer, and an accounts payable system 26 for paying the merchant 50. These backend components may be configured to communicate with one or more front end components, e.g. NAS 13, CAS 20, etc. In an exemplary financial infrastructure, the accounts receivable system 24 may replace or perform the same function as the credit card system 18.

As shown in FIG. 1, in an exemplary stored value card system employing a proxy account number, a card number 6 (1234567891234567) embossed on a stored value card 5 is associated with a stored value account (0000000000000000) in a proxy system comprising a STN server 16 and database 17. When the customer's card 5 is used for a purchase, the stored value account is accessed and debited. After conversion, the card number 6 (1234567891234567) is then associated within the proxy system with the credit account (9999999999999999), such that when the customer's card 5 is used, the credit account is charged and the customer is later invoiced for the charges.

It should be appreciated that the particular implementations shown and described herein are illustrative of the invention and its best mode and are not intended to otherwise limit the scope of the present invention in any way. Indeed, for the sake of brevity, conventional data net-working, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

The components of the present invention are described herein in terms of functional block components, flow charts and various processing steps. As such, it should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like. For a basic introduction of cryptography, please review a text written by Bruce Schneirer which is entitled "Applied Cryptography: Protocols, Algorithms, and Source Code In C", published by John Wiley & Sons (second edition, 1996), which is hereby incorporated by reference.

One skilled in the art will appreciate that a network 8 in FIG. 1, for example, may include any system for exchanging data or transacting business, such as the Internet, an intranet, an extranet, WAN, LAN, satellite or wireless communications, and/or the like.

Customer 1 may interact with the host system 10 or a merchant 50 via any input device such as a telephone, keyboard, mouse, kiosk, personal digital assistant, touch screen, voice recognition device, transponder, biometrics device, handheld computer (e.g., Palm Pilot®), cellular phone, web TV, web phone, blue tooth/beaming device and/or the like. Similarly, the invention could be used in conjunction with any type of personal computer, network computer, workstation, minicomputer, mainframe, or the like running any operating system. Moreover, although the invention uses protocols such as TCP/IP to facilitate network communications, it will be readily understood that the invention could also be implemented using IPX, Appletalk, IP-6, NetBIOS, OSI or any number of existing or future protocols. Moreover, the system contemplates the use, sale, exchange, transfer, or any other distribution of any goods, services or information over any network having similar functionality described herein. Communication between the parties (e.g., customer 1, host 10 and/or merchant 50) to the transaction and the system of the present invention may be accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The merchant 50 computer and the host 10 computer may be interconnected via a second network, referred to as a payment network. The payment network represents existing proprietary networks that presently accommodate transactions for credit cards, debit cards, and other types of financial/banking cards. The payment network is a closed network that is assumed to be secure from eaves-droppers. Examples of the payment network include the American Express®, VisaNet® and the Veriphone® net-work.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, flash card memory and/or the like.

While an exemplary embodiment of this invention is described in association with a financial transaction system, the invention contemplates any type of networks or transaction systems, including, for example, unsecured networks, public networks, wireless networks, closed networks, open networks, intranets, extranets, and/or the like.

As used in the present invention, the term "customer" includes any individual, business, entity, merchant, hardware and/or software who possesses a card number 6 associated with a first transaction account, and desiring to use that card number 6 in association with a second transaction account. In an exemplary embodiment, the customer 1 establishes a new or has an existing relationship or association with a host 10. For example, in one embodiment, a customer 1 may be an American Express® card member. In another embodiment, a customer may be a participant in a frequent flyer rewards program. In a further embodiment, the customer 1 is a member of any suitable organization that provides transaction products or services. Another embodiment contemplates the customer 1 providing the card number 6 to a second party, such that the card number is utilized as a limited use account number.

"Merchant" includes any individual, business, entity, customer, hardware and/or software that receives a card number 6 to facilitate a transaction, whether or not in exchange for goods or services. For example, in one embodiment, a merchant 50 may be an online bookstore such as Amazon.com®. In another embodiment, a merchant 50 may be a local hardware store. Although referred to herein as a "merchant 50," this term contemplates situations where any second party receives a card number 6 and is suitably configured to communicate with the host 10 to process the customer 1 transaction request.

Host 10 includes any person, entity, hardware and/or software that facilitates any type of transaction. As contemplated by an exemplary embodiment of the present invention, the host 10 establishes and maintains account and/or transaction information for the customer 1. The host 10 may issue products to the customer 1 and may also provide both the customer 1 and the merchant 50 with the processes to facilitate the transaction system of the present invention. The host 10 includes, for example, banks, credit unions, credit, debit or other transaction-related companies, telephone companies, or any other type of card or account issuing institutions, such as card-sponsoring companies, incentive rewards companies, or third-party providers under contract with financial institutions. Unless otherwise specifically set forth herein, although referred to as "host," this term should be understood to mean any entity issuing any type of account to facilitate any transaction, exchange or service, and should not be limited to companies possessing or issuing physical cards. In an exemplary system, the host 10 may be any transaction facilitating company such as a charge/credit card provider like American Express®, VISA®, Mastercard®, Discover®, etc.

In an exemplary embodiment, a proxy account number 4 may be used to facilitate the conversion. Proxy number 4 is any number, code, symbol, indicia, etc., that is associated with, or a proxy for, another number or account that has been designated by the customer 1 or the host 10 as a primary account number. As shown in FIG. 1, the proxy number 4 may be the same as the card number 6. In an exemplary embodiment, shown in FIG. 1, the proxy number 4 (1234567891234567) is associated with a stored value account number 2 (0000000000000000) maintained in a stored value account database 15. When the card number 6 (which corresponds to the proxy number 4) is used for a purchase, the associated stored value account number 2 is recognized and the amount of purchase is subtracted from the stored value account balance.

After conversion of the stored value card to a credit card, the proxy number 4 (1234567891234567) is thereafter associated with the designated credit card account number 3 (9999999999999999). Thus, when a purchase is made with the card number 6/proxy number after conversion, the customer's 1 credit account is accessed and the credit account is adjusted accordingly. In another exemplary embodiment, the proxy account system is not utilized. Rather, the card number 6 corresponds directly with the stored value account number instead of the proxy number 4.

In an exemplary embodiment involving credit, debit or other banking cards, the card number 6 has the same industry standard format that is used for the regular banking cards (e.g., 15 or 16 digit numbers). In one embodiment, the numbers are formatted such that one is unable to differentiate between a card number 6 and a regular physical charge card number. Alternatively, however, the host 10 card provider/product identifier (e.g., BIN range, first 6 digits, etc.) numbers may be different so as to differentiate the card numbers used as proxies from regular charge card numbers. In referencing the card number 6 and other transaction account numbers, it should be appreciated that the number may be, for example, a six-teen-digit credit card account number, although each card provider has its own numbering system, such as the fifteen-digit numbering system used by American Express®. Each company's card numbers comply with that company's standardized format such that a company using a sixteen-digit format will generally use four spaced sets of numbers, as represented by the number "0000 0000 0000 0000." The first five to seven digits are reserved for processing purposes and identify the issuing bank, card type, etc. In this example, the last sixteenth digit is used as a sum check for the sixteen-digit number. The intermediary eight-to-ten digits are used to uniquely identify the customer 1. The invention contemplates the use of other numbers, indicia, codes or other security steps in addition to the use of the card number 6.

Before discussing the conversion process of the present invention, an understanding of the system and operation of an exemplary stored value account is discussed. The card number 6 on the stored value card may be associated with a stored value account via a proxy system using a proxy server (STN 16) and database 17 shown in FIG. 1. Alternatively, the card number 6 corresponds directly to the stored value account without using a proxy system. Regardless of the system configuration, whenever card number 6 is used, the stored value account is debited for the amount of the transaction.

Figure 2:
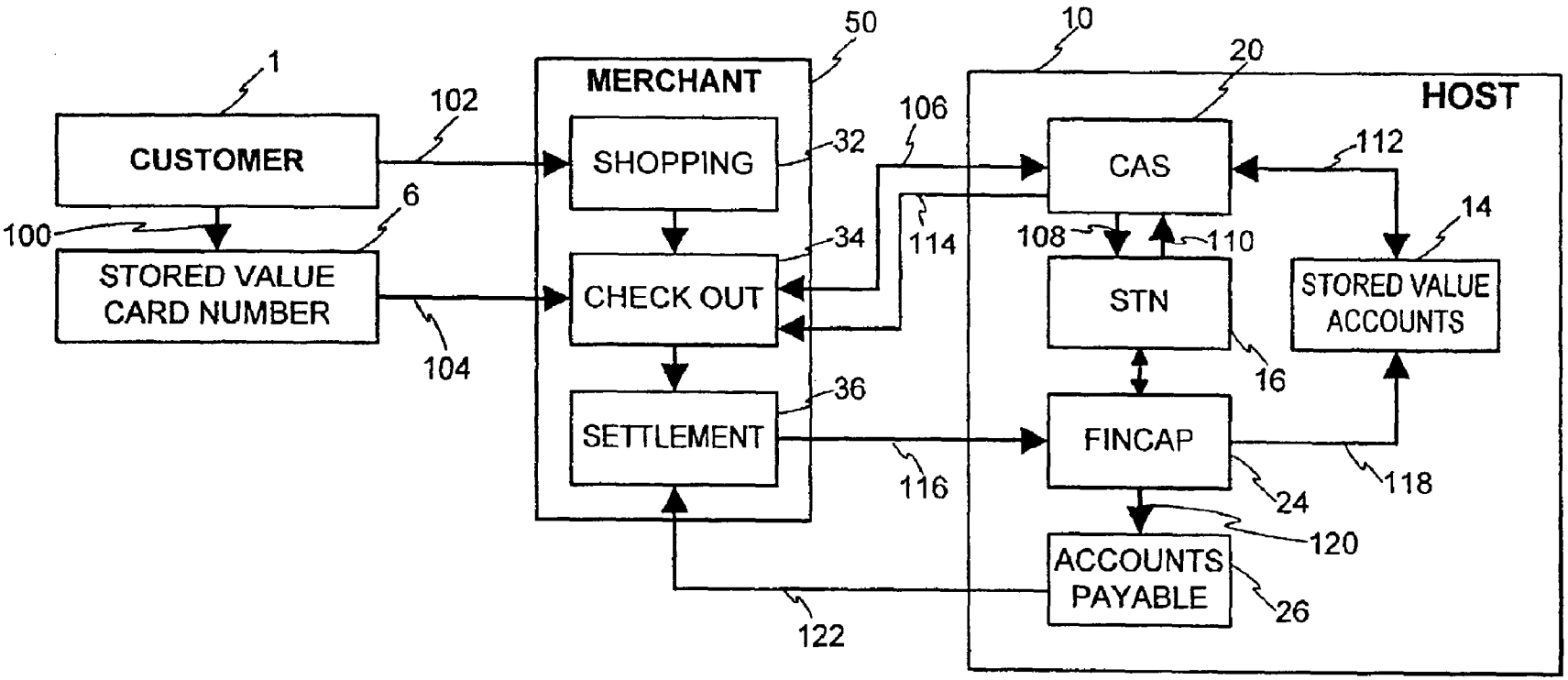
FIG. 2 is a schematic illustrating the process of using a stored value account via a proxy account.

Referencing both FIGS. 1 and 2, to facilitate use of a stored value card via a proxy number 4 using STN 16, a customer 1 acquires a pre-funded stored value card 5 (STEP 100), from, e.g., a retail store. The customer 1 selects merchandise for purchase (STEP 102) from a merchant 50 and presents the card 5 to pay for the purchase (STEP 104). This shopping and purchase may occur online over the internet, in-person at a point of sale terminal (POS) and/or via any other transaction interface. The merchant 50 recognizes the card 5 as being issued by particular host 10 and requests the payment be authorized by the host 10 (STEP 106). The authorization system CAS 20 accepts the request, recognizes that the card number 6 on card 5 corresponds to a proxy number 4 in the STN 16 system and requests the primary account associated with the proxy number 4 (STEP 108). Within STN 16 (and database 17), for example, the proxy number 4 is associated with a corresponding stored value account number 2. STN 16 accesses its profile for the proxy account number 4, identifies the actual stored value account number and returns the actual account number to CAS 20 (STEP 110) for authorization. CAS 20 then recognizes the stored value account and forwards the request to the stored value account system 14 for authorization (STEP 112). The stored value system 14 applies its standard rules and conditions and returns an authorization response to CAS 20 for return to the requesting merchant 50 (STEP 114). The merchant 50 then completes the transaction with the customer 1.

If the payment was authorized, the merchant 50 will use its existing infrastructure (e.g., settlement system 36) to submit the transaction to FINCAP 24 at host 10 for settlement (STEP 116), where FINCAP 24 communicates with the stored value system 14 to reduce the balance of the stored value account associated with the proxy account number 4 (corresponding to card number 6) (STEP 118). Similarly, FINCAP 24 communicates with the accounts payable system 26 (STEP 120) to ensure that the merchant 50 is paid for the transaction (STEP 122).

It should be appreciated that the card number 6 may be the same as the proxy number 4, which is then associated with other accounts, e.g., stored value account 2 or credit card account 3. Alternatively, card number 6 may directly correspond to the stored value account 2 or credit card account 3, in which case the proxy account, e.g., STN 16 system, may not be needed.

Figure 3:
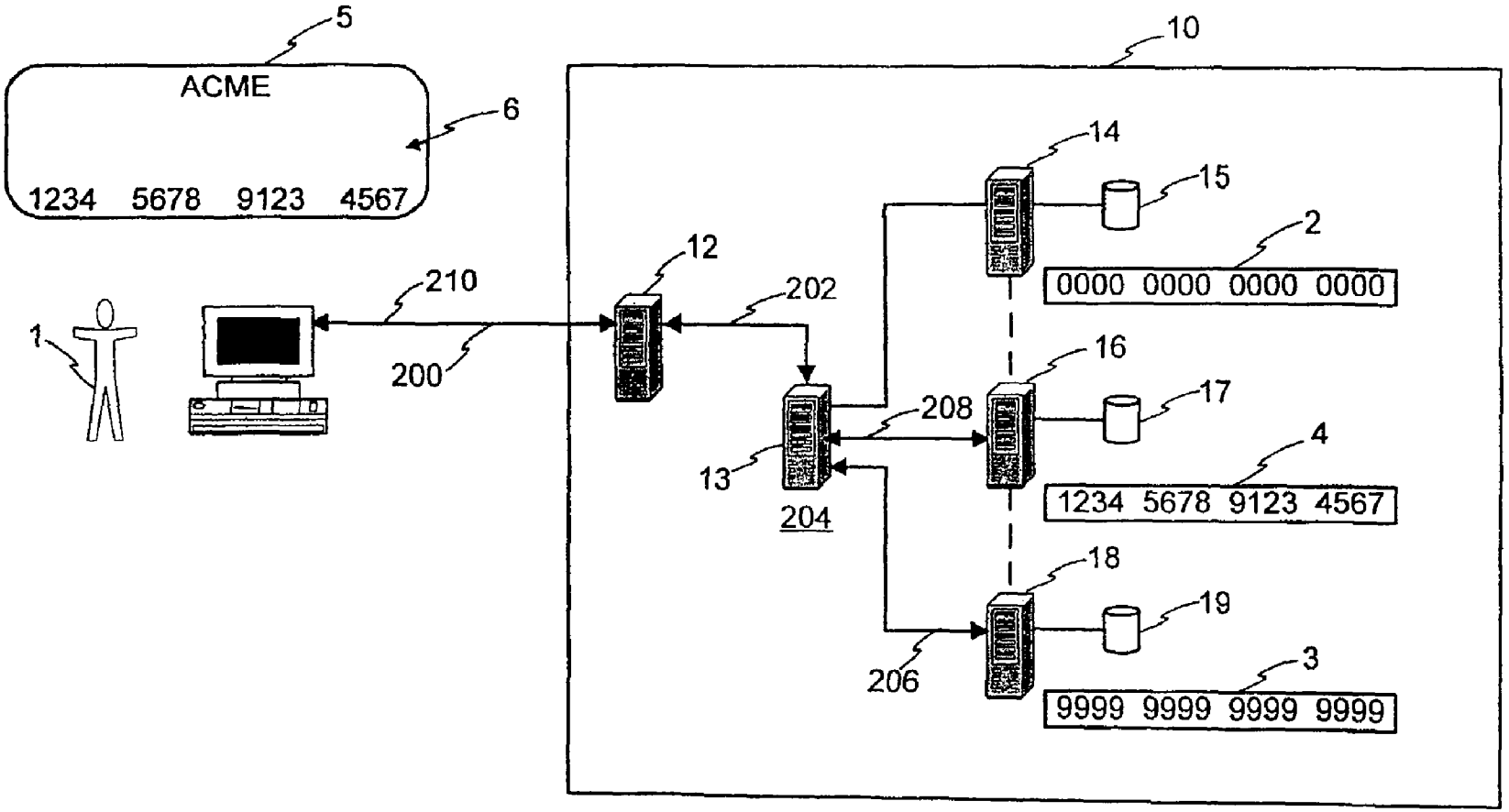
FIG. 3 is a schematic illustrating the processes involved in converting the stored value card to a credit card.
Figure 4:
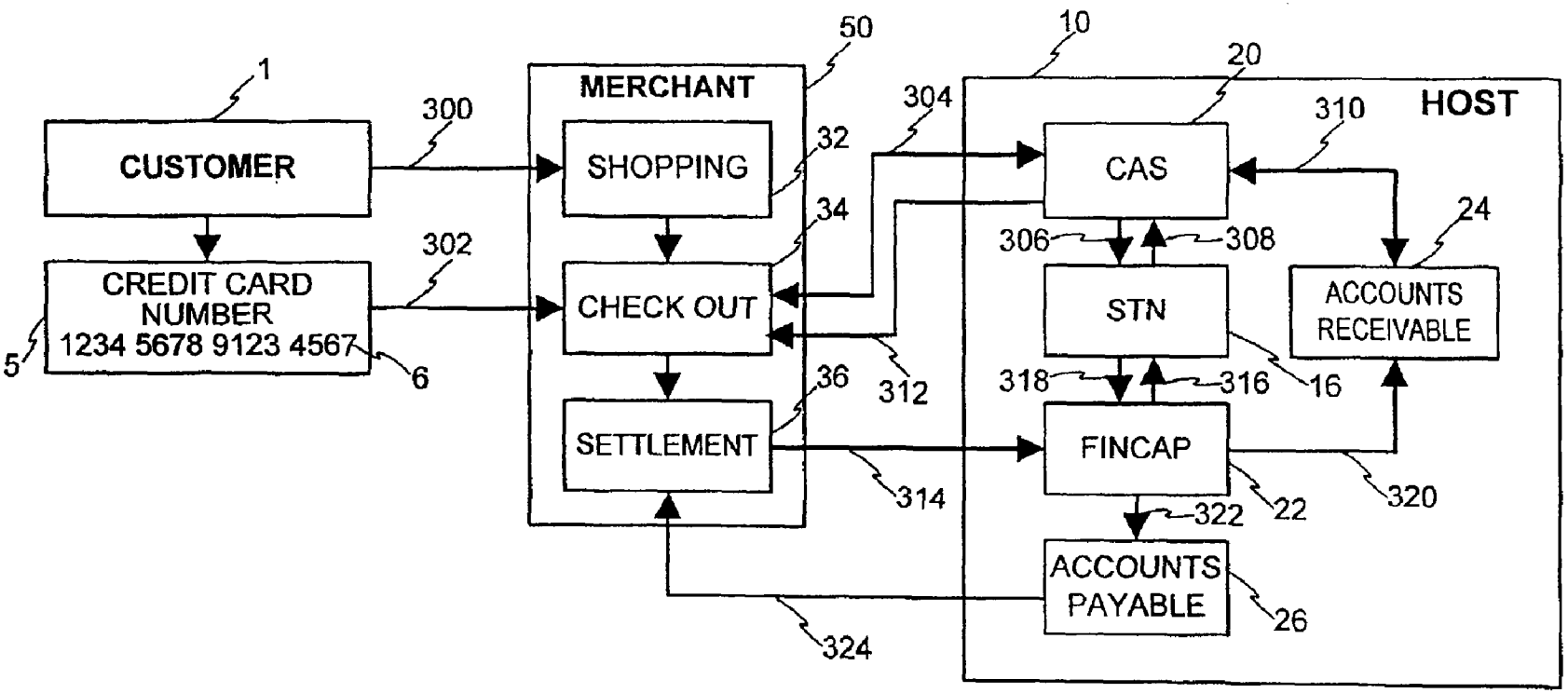
FIG. 4 is a schematic illustrating the process of using a card number as a credit card device after conversion.

An exemplary online system and method for establishing a credit card account and converting a stored value card to a credit card is now described. In an exemplary embodiment of the present invention, as illustrated in FIG. 3, a customer 1 desiring to convert an existing stored value card to a credit card communicates with host 10 (e.g., host web server 12) via any communication means discussed herein and enters a "convert card registration page," wherein the customer 1 provides the stored value account number to be converted by the system (STEP 200). In the embodiment depicted in FIG. 3, card number 6 corresponds to a proxy account 4 associated with the stored value account 2 maintained in the stored value account database 15. The customer 1 is then directed to an online application page within the host web server where the customer 1 is requested to complete an application form comprising various fields, e.g., name, address, income, etc. After the customer 1 completes the application page, the application information is forwarded to the host 10 new accounts system 13 (STEP 202), wherein the application information is evaluated according to host system 10 rules and processes. Criteria for credit approval may include, inter alia credit rating, debt/income ratio, etc. If the application is approved, a new account is created and assigned to customer 1 (STEP 204). A database entry and account is created within the credit card database 19 (STEP 206). Although a credit card database 19 and server 18 are shown in FIG. 3, it should be appreciated that an accounts receivable system (see FIG. m 1) ay be similarly configured. Other host system components (e.g., CAS 20, A/R 24) are updated accordingly. An account conversion instruction set is then sent to the proxy account system, e.g., STN 16, instructing the proxy account 4 to be reassociated from the stored value account 2 to the newly created credit card account 3 (STEP 208). As such, the customer's card number 6 (corresponding to proxy account 4) is thereafter associated with the newly created credit card account 3. After the conversion, the customer is notified that the card 5 may now be used as a credit card for the newly created credit card account (STEP 210). In an exemplary embodiment, the approval and notification process is a substantially real time process occurring over a distributed network, e.g., internet, electronic kiosk, ATM, etc. In other words, the customer 1 may apply for a credit card and convert the stored value card to a credit card in the same online session. For additional information relating to the online or real time acquisition process, please refer to currently pending patent application Ser. No. 10/071,615, entitled "Electronic Acquisition System and Method," by Stoxen , et al., filed on Feb. 5, 2002, the entire contents of which are incorporated herein by reference. F FIG. 4 illustrates use of the card number 6 as a second transaction account device (e.g., credit card) that is, after the first transaction account (e.g., stored value account) has been converted to a second transaction account (credit card account). In an exemplary embodiment it should be noted that, except for authorizing the card differently, the flow is similar to that of the stored value card before conversion. Accordingly, as shown in FIG. 4, a customer 1 goes online to an online shopping site 32 at a merchant 50 and selects merchandise for purchase (STEP 300). During checkout 34, the customer 1 indicates that the card number(now associated with credit card account will be used to pay for the purchase (STEP 302). The merchant 50 requests a standard authorization for the account from the host 10 (STEP 304). CAS 20 recognizes the card number 6 as corresponding to a proxy account and forwards the request to the proxy account system, e.g., STN 16 (STEP 306). STN 16 identifies the credit card account corresponding to card number 6, and returns the credit account number 2 (see FIG. 1) to CAS 20 for authorization (STEP 308). CAS 20 communicates with the credit card account system, e.g., accounts receivable 24, to apply authorization rules and conditions (STEP 310). An authorization response is then provided to the merchant 50 (STEP 312). When approved, the merchant 50 submits the transaction receipt and/or summary of charges using its standard submission method to the FINCAP 24 (STEP 314). FINCAP 24 recognizes the card number 6 as corresponding to a proxy number 4 and forwards the transaction to the proxy account system, e.g., STN 16 (STEP 316). STN 16 translates the card number 6 into the associated credit account number 2 and returns this credit account number 2 to FINCAP 24 (STEP 318). FINCAP 24 forwards the transaction to the appropriate credit card system, e.g., accounts receivable 24, for customer statementing and billing (STEP 320). FINCAP 24 then forwards the transaction to the accounts payable system 26 (STEP 322) for merchant 50 payment (STEP 324), thus completing a transaction with a card 5 after it has been converted to a credit card.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

It should be appreciated that the particular implementations shown and described herein are illustrative of the invention and its best mode and are not intended to otherwise limit the scope of the present invention in any way. Indeed, for the sake of brevity, conventional data net-working, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical contract optimization or contract compliance system.

What is claimed is:

1. A method for facilitating the re-association of an account number associated with a first transaction account to a second transaction account, comprising the steps of:

providing said second transaction account;

receiving said account number associated with said first transaction account; *and* associating account number with said second transaction account;

wherein said account number is a proxy account number [associate] *associated* with a transponder, wherein said proxy account number within a proxy system is configured to associate said proxy account number to more than one transaction account, and wherein said proxy account number is authorized to be used for multiple transactions.

2. The method of claim 1, wherein said account number comprises unchangeable indicia permanently associating said account number with a proxy account number.

3. The method of claim 1, wherein said first transaction account includes at least one of a stored value account, charge card account, loyalty account, phone card account, credit card account, and debit card account.

4. The method of claim 1, wherein said second transaction account includes at least one of a stored value account, charge card account, loyalty account, phone card account, credit card account, and debit card account.

5. The method of claim 1, wherein said account number includes at least one of *a* number, code, letter, symbol, and biometric.

6. The method of claim 1, wherein said receiving step further includes receiving a PIN.

7. A method for facilitating the re-association of an account number associated with a first transaction account to a second transaction account, comprising the steps of:

providing said second transaction account;

receiving said account number associated with said first transaction account; *and* associating said account number with said second transaction account, wherein said second transaction account is associated with at least one of a stored value account, charge card account, loyalty account, phone card account, credit card account, and debit card account; wherein said account number is a proxy account number, wherein said proxy account number within a proxy system is configured to associate said proxy account number to more than one transaction account, and wherein said proxy account number is authorized to be used for multiple transactions.

*8. A method for facilitating the re-association of an account code associated with a first transaction account to a second transaction account, comprising:*

*receiving said account code associated with said first transaction account; and*

*associating said account code with said second transaction account;*

*wherein said account code comprises a proxy account code within a proxy system, wherein said proxy account code is configured to associate said proxy account code to more than one transaction account, and wherein said proxy account code is authorized to be used for multiple transactions.*

*9. The method of claim 8, wherein said account code comprises unchangeable indicia permanently associating said account code with said proxy account code.*

*10. The method of claim 8, wherein said first transaction account includes at least one of a stored value account, charge card account, loyalty account, phone card account, credit card account, and debit card account.*

*11. The method of claim 8, wherein said second transaction account includes at least one of a stored value account, charge card account, loyalty account, phone card account, credit card account, and debit card account.*

*12. The method of claim 8, wherein said account code includes at least one of: a card number, account number, account identifier, account indicia, letter, symbol, and biometric.*

*13. The method of claim 8, wherein said receiving of said account code further comprises receiving a PIN.*

*14. The method of claim 8, wherein said proxy account code is associated with a transponder.*

*15. A method for facilitating the re-association of an account code associated with a first transaction account to a second transaction account, comprising:*

*receiving said account code associated with said first transaction account; and*

*associating said account code with said second transaction account, wherein said second transaction account is associated with at least one of a stored value account, charge card account, loyalty account, phone card account, credit card account, and debit card account;*

*wherein said account code comprises a proxy account code within a proxy system, wherein said proxy account code is configured to associate said proxy account code to more than one transaction account, and wherein said proxy account code is authorized to be used for multiple transactions.*

* * * * *

UNITED STATES PATENT AND TRADEMARK OFFICE

CERTIFICATE OF CORRECTION

PATENT NO. : RE43,157 E
APPLICATION NO. : 12/023834
DATED : February 7, 2012
INVENTOR(S) : Bishop et al.

It is certified that error appears in the above-identified patent and that said Letters Patent is hereby corrected as shown below:

Title page, item (54), under "Title", in Column 1, Line 2, and Column 1, line 2, (in the Title) delete "REASSOCIATING" and insert -- RE-ASSOCIATING --.

Page 12, item (56), under "Other Publications", in Column 2, Line 62, delete "2004, 1." and insert -- 2004, 1 page. --.

Page 12, item (56), under "Other Publications", in Column 2, Line 73, delete "Croproation," and insert -- Corporation, --.

Page 13, item (56), under "Other Publications", in Column 2, Line 32, delete "May 11, 2006" and insert -- May 17, 2006 --.

Page 17, item (56), under "Other Publications", in Column 2, Line 41, delete "relased" and insert -- released --.

Page 17, item (56), under "Other Publications", in Column 2, Line 66, delete "/infotooth/tutoria1/" and insert -- /infotooth/tutorial/ --.

Column 1, line 14, delete "The application" and insert -- *The application* --.

Column 1, line 16, delete "*itself*" and insert -- *itself* [The application] --.

Signed and Sealed this
Fourth Day of September, 2012

David J. Kappos

David J. Kappos
*Director of the United States Patent and Trademark Office*